(12) United States Patent
Inayoshi et al.

(10) Patent No.: US 8,467,931 B2
(45) Date of Patent: Jun. 18, 2013

(54) SEAT OCCUPANCY DETERMINING APPARATUS

(75) Inventors: Muneto Inayoshi, Nagoya (JP); Akira Enomoto, Kariya (JP); Hiroyuki Fujii, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 427 days.

(21) Appl. No.: 12/813,736

(22) Filed: Jun. 11, 2010

(65) Prior Publication Data

US 2011/0010037 A1 Jan. 13, 2011

(30) Foreign Application Priority Data

Jul. 7, 2009 (JP) ................... 2009-160901

(51) Int. Cl.
*G06F 7/00* (2006.01)
(52) U.S. Cl.
USPC .......................... 701/31.4; 180/273
(58) Field of Classification Search
USPC ................. 701/45, 33.6–33.9, 31.4; 180/273, 180/271, 268; 280/735, 734
See application file for complete search history.

(56) References Cited

U.S. PATENT DOCUMENTS

| | | | |
|---|---|---|---|
| 6,536,636 B1* | 3/2003 | McDonniel | 223/111 |
| 8,296,099 B2 | 10/2012 | Ito et al. | |
| 2002/0024257 A1* | 2/2002 | Fujimoto et al. | 307/10.1 |
| 2004/0040390 A1* | 3/2004 | Kojima et al. | 73/862.52 |
| 2004/0159486 A1* | 8/2004 | Mutou et al. | 180/273 |
| 2005/0187736 A1* | 8/2005 | Wanami et al. | 702/173 |
| 2011/0005843 A1 | 1/2011 | Ito et al. | |
| 2011/0010038 A1 | 1/2011 | Inayoshi et al. | |
| 2011/0010039 A1 | 1/2011 | Inayoshi et al. | |
| 2011/0010056 A1 | 1/2011 | Inayoshi et al. | |

FOREIGN PATENT DOCUMENTS

JP 2009-046093 A 3/2009

* cited by examiner

*Primary Examiner* — Marthe Marc-Coleman
(74) *Attorney, Agent, or Firm* — Buchanan Ingersoll & Rooney P.C.

(57) ABSTRACT

A seat occupancy determining apparatus includes right and left load detecting portion provided at right and left side portions of a seat portion of a vehicle seat and detecting load applied thereto, respectively, a vehicle operation detecting portion for detecting an operation of a predetermined component of a vehicle, and a seat occupancy determining portion determining a seat occupancy state of the vehicle seat on the basis of signals outputted from the vehicle operation detecting portion and the right and left load detecting portion, the seat occupancy determining portion calculating a left-right load difference value on the basis of the detection loads and determining that vehicle seat is in a child seat fastened state where the child seat is fastened to the vehicle seat by means of a seat belt apparatus in a case where a fluctuation of the left-right load difference value occurs after the predetermined component is operated.

20 Claims, 10 Drawing Sheets

F I G. 14
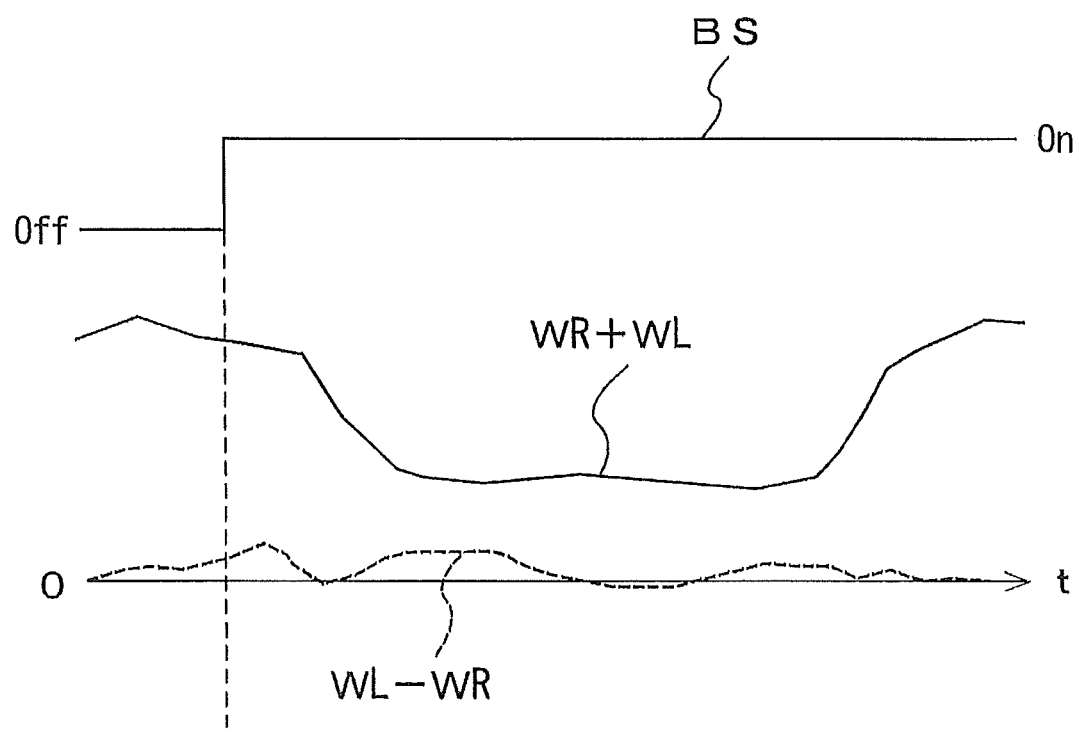

US 8,467,931 B2

SEAT OCCUPANCY DETERMINING APPARATUS

CROSS REFERENCE TO RELATED APPLICATIONS

This application is based on and claims priority under 35 U.S.C. §119 to Japanese Patent Application 2009-160901, filed on Jul. 7, 2009, the entire content of which is incorporated herein by reference.

TECHNICAL FIELD

This disclosure generally relates to a seat occupancy determining apparatus for determining a seat occupancy state of a vehicle seat.

BACKGROUND

Disclosed in JP2009-46093A is an example of a known seat occupancy determining apparatus that includes plural load sensors between a cushion portion of a passenger seat (e.g. a front passenger seat, which will be hereinafter referred to also as a vehicle seat) for the vehicle and a vehicle floor and that detects a seat occupancy state of the vehicle seat (i.e. a seating state of an passenger on the vehicle seat) on the basis of a sum of loads detected by plural load sensors. More specifically, according to the seat occupancy determining apparatus disclosed in JP2009-46093A, a side leg portion is formed at each of four corners at a bottom portion of a seat cushion portion, so that the seat cushion portion is movably engaged with seat rails via the side leg portions. The load sensor is provided at each side leg portion, so that the load sensor detects a load applied to the corresponding side leg portion. The seat occupancy determining apparatus disclosed in JP2009-46093A further includes a seat occupancy determining portion, which detects the seating state of the passenger on the vehicle seat by comparing the sum of the loads detected by plural load sensors with a predetermined threshold value.

The seat occupancy determining apparatus executes various controls. For example, the seat occupancy state of the vehicle seat (i.e. the seating state of the passenger on the vehicle seat) detected by the seat occupancy determining apparatus is used for an actuation control of an air bag. More specifically, for example, in a case where the seat occupancy determining apparatus determines that an adult is seated on the passenger seat for the vehicle, the seat occupancy determining apparatus controls the air bag to be in a fully-deployable state. On the other hand, in a case where the seat occupancy determining apparatus determines that the passenger is not seated on the vehicle seat or in a case where the seating determination apparatus determines that a child is seated on a child seat that is fastened to the vehicle seat, the seat occupancy determining apparatus controls the air bag not to be opened or not to be fully-deployed.

However, the seat occupancy state of the vehicle seat (i.e. the seating state of the passenger on the vehicle seat) may not be properly detected in the case where the seat occupancy state of the vehicle seat is determined only on the basis of the sum of the loads applied thereto. For example, a relatively great load may be temporarily applied to the seat cushion when the child seat is fastened to the vehicle seat by means of a seat belt in order to attach the child seat on the vehicle seat.

In other words, in a case where the child seat is placed on the vehicle seat and a tongue of the seat belt is engaged with a buckle of the seat belt, a relatively great load is likely to temporarily act on the seat cushion via the buckle. In a case where the load applied to the seat cushion becomes equal to or greater than a predetermined threshold value when the tongue and the buckle are engaged, the seat occupancy determining apparatus may mistakenly determine that an adult is seated on the vehicle seat.

The above-mentioned drawback is more likely to occur in a case where the number of load sensors provided at the vehicle seat is reduced in order to reduce manufacturing costs of the vehicle seat. In other words, accurately detecting the seating state of the passenger on the vehicle seat (i.e. the seat occupancy state of the vehicle seat) conflicts with a reduction of the manufacturing costs of the vehicle seat.

A need thus exists to provide a seat occupancy determining apparatus which is not susceptible to the drawback mentioned above.

SUMMARY

According to an aspect of this disclosure, a seat occupancy determining apparatus includes a left load detecting portion provided at a left side portion of a seat portion of a vehicle seat and detecting a load applied to the left portion of the seat portion, a right load detecting portion provided at a right side portion of the seat portion and detecting a load applied to the right side portion of the seat portion, a vehicle operation detecting portion for detecting an operation of a predetermined component of a vehicle, and a seat occupancy determining portion determining a seat occupancy state of the vehicle seat on the basis of signals outputted from the vehicle operation detecting portion, the left load detecting portion and the right load detecting portion, the seat occupancy determining portion calculating a load difference value by subtracting the load detected by one of the right and left load detecting portion from the load detected by the other one of the right and left load detecting portion and determining that a child seat is placed on the vehicle seat and the vehicle seat is in a child seat fastened state where the child seat is fastened to the vehicle seat by means of a seat belt apparatus in a case where an increase of the load difference value from a minus reference value, which is set as a negative value, by a predetermined value occurs or in a case where a decrease of the load difference value from a plus reference value, which is set as a positive value, by a predetermined value occurs after the predetermined component of the vehicle is operated.

According to another aspect of this disclosure, a seat occupancy determining apparatus includes a left load detecting portion provided at a left side portion of a seat portion of a vehicle seat and detecting a load applied to the left portion of the seat portion, a right load detecting portion provided at a right side portion of the seat portion and detecting a load applied to the right side portion of the seat portion, a vehicle operation detecting portion for detecting an operation of a predetermined component of a vehicle, and a seat occupancy determining portion determining a seat occupancy state of the vehicle seat on the basis of signals outputted from the vehicle operation detecting portion, the left load detecting portion and the right load detecting portion, the seat occupancy determining portion calculating a total load value by adding the load detected by the right load detecting portion and the load detected by the left load detecting portion and a load difference value by subtracting the load detected by one of the right and left load detecting portion from the load detected by the other one of the right and left load detecting portion, and determining that a child seat is placed on the vehicle seat and the vehicle seat is in a child seat fastened state where the child seat is fastened to the vehicle seat by means of a seat belt apparatus in a case where a decrease of the total load value from a total load reference value by a predetermined value and an increase of the load difference value from a minus reference value, which is set as a negative value, by a predetermined value occurs, or a decrease of the load difference value from a plus reference value, which is set as a positive value, by a predetermined value, occurs after the predetermined component of the vehicle is operated.

According to a further aspect of this disclosure, a seat occupancy determining apparatus includes a left load detecting portion provided at a left side portion of a seat portion of a vehicle seat and detecting a load applied to the left portion of the seat portion, a right load detecting portion provided at a right side portion of the seat portion and detecting a load applied to the right side portion of the seat portion, a vehicle operation detecting portion for detecting an operation of a predetermined component of a vehicle, and a seat occupancy determining portion determining a seat occupancy state of the vehicle seat on the basis of signals outputted from the vehicle operation detecting portion, the left load detecting portion and the right load detecting portion, the seat occupancy determining portion calculating a total load value by adding the load detected by the right load detecting portion and the load detected by the left load detecting portion and a load difference value by subtracting the load detected by one of the right and left load detecting portion from the load detected by the other one of the right and left load detecting portion, the seat occupancy determining portion simultaneously executing a seating load increase and decrease determination and a seating load peak determination, wherein the seating load increase and decrease determination is satisfied in a case where a decrease of the total load value from a total load reference value by a predetermined value and an increase of the load difference value from a minus reference value, which is set as a negative value, by a predetermined value, occurs or in a case where a decrease of the load difference value from a plus reference value, which is set as a positive value, by a predetermined value, occurs after the predetermined component of the vehicle is operated and the seating load peak determination is satisfied in a case where an increase of the total load value at a predetermined changing speed or faster and then, a decrease of the total load value at a predetermined changing speed or lower, occurs approximately when the predetermined component of the vehicle is operated, and the seat occupancy determining portion determines that a child seat is placed on the vehicle seat and the vehicle seat is in a child seat fastened state where the child seat is fastened to the vehicle seat by means of a seat belt apparatus, in a case where at least one of the seating load increase and decrease determination and the seating load peak determination is satisfied.

BRIEF DESCRIPTION OF THE DRAWINGS

The foregoing and additional features and characteristics of this disclosure will become more apparent from the following detailed description considered with the reference to the accompanying drawings, wherein:

FIG. 14 is a comparison example indicating a state of the seating load acting on the vehicle seat in a case where a passenger seated on the vehicle seat stoops forward.

DETAILED DESCRIPTION

An embodiment of a seat occupancy determining apparatus will be described below with reference to FIGS. 1 to 14 of the attached drawings. In this embodiment, an expression "forward (front)" refers to "forward (front)" with reference to a passenger seated on a vehicle seat 1, "right (a right portion)" of the vehicle seat 1 refers to "right side" with reference to the passenger on the vehicle seat 1, and "left (a left portion)" of the vehicle seat 1 refers to "left side" with reference to the passenger on the vehicle seat 1.

Figure 1:
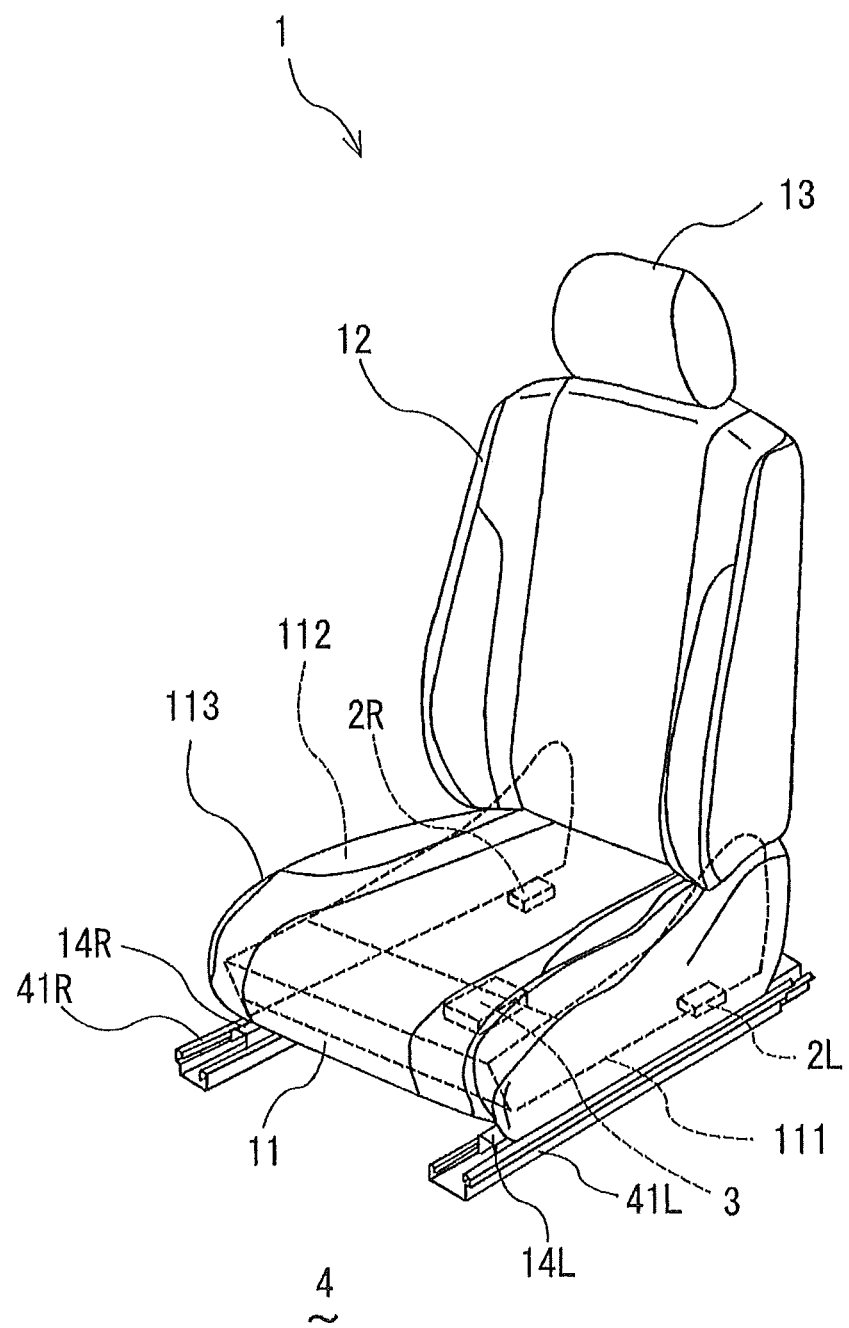
FIG. 1 is a perspective view of a vehicle seat, to which a seat occupancy determining apparatus according to an embodiment is provided.

As illustrated in FIG. 1, the vehicle seat 1, which is adapted as a passenger seat (e.g. a front passenger seat arranged next to a driver's seat) mounted on a right-hand drive vehicle, includes a seat cushion 11, which is configured so that the passenger sits thereon and which serves as a seat portion, and a seat back 12, which is attached at a rear end portion of the seat cushion 11 so as to be pivotable in forward and rearward directions and which serves as a backrest for the occupant. Furthermore, a headrest 13 for supporting a head region of the passenger is attached at an upper end portion of the seat back 12.

The seat cushion 11 includes a seat frame 111, a pad portion 112, which is arranged above the seat frame 111, and a cover 113, which covers a surface of the pad portion 112. A pair of upper rails 14R and 14L, which are arranged in parallel to each other so as to extend in a front-rear direction of a vehicle, are attached at a bottom surface of the seat frame 111. The upper rails 14R and 14L are engaged with a pair of lower rails 41R and 41L, which are fixed on a vehicle floor 4, respectively, so as to be movable in the front-rear direction. The vehicle seat 1 is configured so as to be movable on the vehicle floor 4 in the front-rear direction and so as to be fixed (stopped) at any position desired by the passenger.

A pair of seat occupancy detecting sensors 2R and 2L are disposed between the seat frame 111 on the one hand and the upper rails 14R and 14L on the other, respectively. A load sensor, which is configured with a strain gauge and the like, is adapted as each of the seat occupancy detecting sensors 2R and 2L. Furthermore, each of the seat occupancy detecting sensors 2R and 2L detects a load applied to the seat cushion 11 in a downward direction when the passenger is seated on the vehicle seat 1 or when an object such as a luggage and the like is placed on the vehicle seat 1. In this embodiment, the loads (both the load generated when the passenger is seated on the vehicle seat 11 and the load generated when the luggage is placed on the vehicle seat 1), which is applied to the seat cushion 11 and which is detected by the corresponding seat occupancy detecting sensors 2R and 2L, is referred to as seating loads. Additionally, any kind, type and detection principle may be adapted to each of the seat occupancy detecting sensors 2R and 2L.

The seat occupancy detecting sensor 2R, which is arranged at a right portion of the vehicle seat 1 and which will be hereinafter referred to as a right seat occupancy detecting sensor 2R (which serves as a right load detecting portion), is disposed between a right portion of the seat frame 111 and the upper rail 14R, which is arranged below the right portion of the vehicle seat 1. Furthermore, the right seat occupancy detecting sensor 2R detects the load applied to a right portion of the seat cushion 11. Similarly, the seat occupancy detecting sensor 2L, which is arranged at a left portion of the vehicle seat 1 and which will be hereinafter referred to as a left seat occupancy detecting sensor 2L (which serves as a left load detecting portion), is disposed between e left portion of the seat frame 111 and the upper rail 14L, which is arranged at a left portion of the vehicle seat 1. Furthermore, the left seat occupancy detecting sensor 2L detects the load applied to a left portion of the seat cushion 11. The right seat occupancy detecting sensor 2R and the left seat occupancy detecting sensor 2L are arranged so as to be spaced away from each other by a predetermined distance in a width direction of the seat cushion 11.

As illustrated in FIG. 1, the right and left seat occupancy detecting sensors 2R and 2L are arranged at a rear portion of the seat cushion 11. More specifically, the right and left seat occupancy detecting sensors 2R and 2L are arranged at the rear portion of the seat cushion 11 posterior to a middle portion thereof in the front-rear direction. The right seat occupancy detecting sensor 2R is arranged in the vicinity of a supporting portion of a buckle 64 of a seat belt apparatus 6. Hereinafter, in a case where the right seat occupancy detecting sensor 2R and the left seat occupancy detecting sensor 2L are comprehensively referred, the right and left seat occupancy detecting sensors 2R and 2L will be referred to as seat occupancy detecting sensors 2R and 2L.

Figure 2:
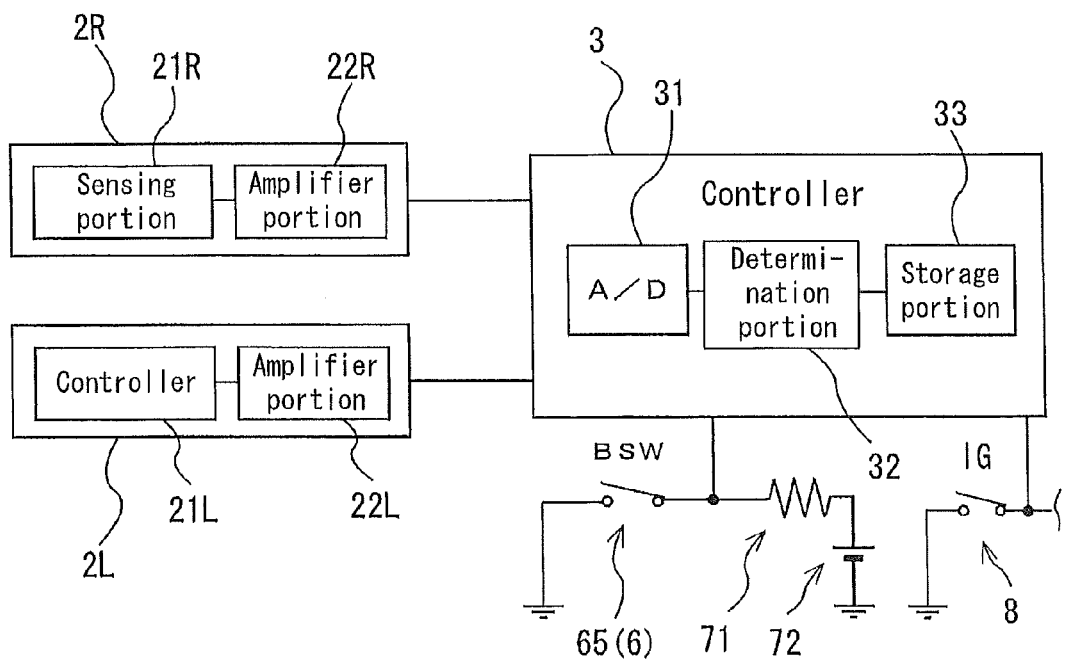
FIG. 2 is a block diagram illustrating an entire configuration of the seat occupancy determining apparatus.

As illustrated in FIG. 2, the right seat occupancy detecting sensor 2R includes a sensing portion 21R and an amplifier portion 22R for amplifying a detection signal generated by the sensing portion 21R. Similarly, the left seat occupancy detecting sensor 2L includes a sensing portion 21L and an amplifier portion 22L for amplifying a detection signal generated by the sensing portion 21L. Each of the sensing portions 21R and 21L is configured with the Wheatstone bridge circuit including four strain gauges.

The right and left seat occupancy detecting sensors 2R and 2L are connected to a controller 3, which serves as a seat occupancy determining portion. The controller 3 includes an analog-to-digital converter 31 (i.e. an A/D converter 31), which converts the detection signals outputted from the right and left seat occupancy detecting sensors 2R and 2L into digital signals, a determination portion 32 for determining a seat occupancy state of the vehicle seat 1 (a seating state of the passenger on the vehicle seat 1) on the basis of the detection signals, and a storage portion 33 for storing therein various data necessary for determining the seat occupancy state of the vehicle seat 1.

A buckle switch 65, which serves as a vehicle operation detecting portion and which is included in the seat belt apparatus 6, is connected to the controller 3. A battery 72 of the vehicle is connected to the buckle switch 65 via a direct current resistor 71. In a case where the buckle switch 65 is in an opened state, the controller 3 detects a voltage (high) at a positive terminal of the battery 72, because an electric current does not flow through the direct current resistor 71. On the other hand, in a case where the buckle switch 65 is in a closed state, the electric current flows through the direct current resistor 71, so that the controller 3 detects a decrease in the voltage (low) because of the direct current resistor 71. Accordingly, the controller 3 detects that the seat belt apparatus 6 is fastened when the buckle 64 is engaged with a tongue 63 (i.e. when the buckle switch 65 is turned on). Furthermore, an ignition switch 8 of the vehicle is connected to the controller 3. The controller 3 is configured so as to determine whether the ignition switch 8 is in an on-state or an off-state.

Figure 3:
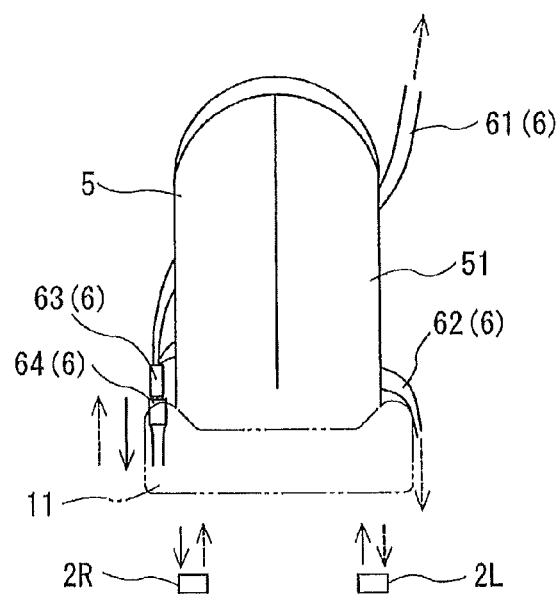
FIG. 3 is a simplified diagram for explaining a load applied to a vehicle seat.

A procedure of attaching a child seat 5 (which is also referred to as an infant seat) on the seat cushion 11 of the vehicle seat 1 and a load to be generated on the vehicle seat 1 when the child seat 5 is attached thereon will be described below with reference to FIG. 3. Illustrated in FIG. 3 is the vehicle seat 1 when being viewed from front thereof. The seat belt apparatus 6 (which serves as a predetermined component of the vehicle) of the vehicle seat 1 includes a shoulder strap 61 and a lap strap 62, whose one end portions are connected to the tongue 63. Furthermore, the seat belt apparatus 6 includes the buckle 64, which configures the buckle switch 65 that is turned on when the tongue 63 and the buckle 64 are engaged and is turned off when the tongue 63 and the buckle 64 are disengaged. A retractor is provided within a pillar arranged at the left of the vehicle seat 1. An upper end portion (the other end portion) of the shoulder strap 61 is connected to the retractor, so that the shoulder strap 61 is configured so as to be reeled out while resisting against a rolling force generated by the retractor.

The other end portion of the lap strap 62 is connected to a retractor provided at a lower left of the vehicle seat 1. Therefore, the other end portion of the lap strap 62 also receives a rolling force generated by the retractor. The buckle 64 is fixed on the vehicle seat 1 at a lower right of the vehicle seat 1 so as to extend upward from the lower right of the vehicle seat 1. The tongue 63, to which the shoulder strap 61 and the lap strap 62 are connected, is configured so as to be firmly engaged with the buckle 64.

In a case where the tongue 63 and the buckle 64 of the seat belt apparatus 6 is in a disengaged state, the buckle switch 65 is in the opened state (i.e. an off-state). On the other hand, when the tongue 63 is engaged with the buckle 64, the buckle switch 65 is turned to be in the closed state (i.e. in an on-state), so that the controller 3 detects that the seat belt apparatus 6 is fastened.

In this embodiment, the child seat 5 is assumed to be attached rearwardly on the vehicle seat 1 so that an infant (including a baby, who is supposed to be seated on the child seat 5) seated on the child seat 5 faces a rearward portion of the vehicle. After the child seat 5 is placed on the seat cushion 11, a user is supposed to pull the shoulder strap 61 and the lap strap 62 of the seat belt apparatus 6 and to insert the shoulder strap 61 and the lap strap 62 into a seat back 51 of the child seat 5. Then, the user is supposed to engage the tongue 63, which is attached at the end portions of the shoulder strap 61 and the lap strap 62, with the buckle 64, thereby fixing the child seat 5 on the vehicle seat 1. Hereinafter, placing the child seat 5 on the vehicle seat 1 and engaging the tongue 63 of the seat belt apparatus 6 with the buckle 64 in order to strap the child seat 5 on the vehicle seat 1 by means of the seat belt apparatus 6 will be referred to as an attachment (a fastening) of the child seat 5 on the vehicle seat 1.

When the tongue 63 is engaged with the buckle 64 after the child seat 5 is placed on the vehicle seat 1, the tongue 63 is pressed against the buckle 64 in a downward direction. Therefore, the load in the downward direction is applied to a right side portion of the vehicle seat 1, via the buckle 64, which may result in rapid increase of a load WR detected by the right seat occupancy detecting sensor 2R (refer to an arrow in solid line in FIG. 3 for the direction of the load acting on the vehicle seat 1). Furthermore, a moment in a counterclockwise direction in FIG. 3 acts on the seat cushion 11 because of the load locally applied to the right side portion of the vehicle seat 1. Accordingly, a load applied to a left side portion of the seat cushion 11 is eased (reduced), therefore, a load WL detected by the left seat occupancy detecting sensor 2L does not increase as much as the load WR detected by the right seat occupancy detecting sensor 2R increases.

After fastening of the seat belt apparatus 6 around the child seat 5 is completed, the end portion of the shoulder strap 61 is upwardly pulled by the retractor within the pillar provided at an upper left of the vehicle seat 1 and the end portion of the lap strap 62 is downwardly pulled by the retractor, which is provided at the lower left portion of the vehicle seat 1. In this embodiment, the load acting on the seat cushion 11 so as to pull the seat cushion 11 in the upward direction via the shoulder strap 61 is referred to as a detachment load. Accordingly, the load WR detected by the right seat occupancy detecting sensor 2R decreases, while the load WL detected by the left seat occupancy detecting sensor 2L increases (refer to arrows in broken line in FIG. 3 for the directions of the load acting on the vehicle seat 1). Additionally, the above-described is changes in the seating loads generated at the vehicle seat 1, which is mounted on the right-hand drive vehicle as the passenger seat. On the other hand, in a case where the vehicle seat 1 is adapted to a left-hand drive vehicle as a passenger seat, a relationship of the right and left in the above-described embodiment is inverted.

The load detected by the seat occupancy detecting sensors 2R and 2L in the case where the child seat 5 is fastened to the vehicle seat 1 will be explained below with reference to FIG. 8. An operation signal outputted from the buckle switch 65 is indicated by a reference code BS in FIG. 8. Furthermore, a result, which is obtained by adding the load detected by the left seat occupancy detecting sensor 2L and the load detected by the right seat occupancy detecting sensor 2R, is indicated as "WR+WL", which will be hereinafter referred to as a total load WR+WL (i.e. a total load value). On the other hand, a load, which is obtained by subtracting the load detected by the right seat occupancy detecting sensor 2R from the load detected by the left seat occupancy detecting sensor 2L is indicated as "WL−WR", which will be hereinafter referred to as a left-right load difference "WL−WR" (i.e. a left-right load difference value, an example of a load difference value).

The total load WR+WL rapidly increases approximately when (i.e. before and after) the child seat 5 is placed on the vehicle seat 1, and then the tongue 63 and the buckle 64 are engaged in order to fasten the child seat 5 on the vehicle seat 1, in other words, when the buckle switch 65 is turned on. Then, when the engagement between the tongue 63 and the buckle 64 is completed, the load for pressing the vehicle seat 1 in the downward direction by the tongue 63 is eased. Accordingly, after the engagement between the tongue 63 and the buckle 54 is completed, the total load WR+WL rapidly decreases, because the left seat occupancy detecting sensor 2L and the right seat occupancy detecting sensor 2R detect only a load applied to the vehicle seat 1 by the child seat 5 and the infant seated thereon (see FIG. 8).

Furthermore, as is mentioned above, at the time when the tongue 63 is engaged with the buckle 64, the load WR detected by the right seat occupancy detecting sensor 2R increases when comparing to the load WL detected by the left seat occupancy detecting sensor 2L. Therefore, the left-right load difference WL−WR rapidly decreases so as to become a negative value approximately when (i.e. before and after) the buckle switch 65 is turned on.

When the engagement between the tongue 63 and the buckle 64 is completed, the load applied to the vehicle seat 1 via the tongue 63 so as to press the vehicle seat 1 in the downward direction is eased. Accordingly, after the engagement between the tongue 63 and the buckle 64 is completed, the left seat occupancy detecting sensor 2L and the right seat occupancy detecting sensor 2R detect only the load applied to the vehicle seat 1 by the child seat 5 and the infant seated thereon. Therefore, the left-right load difference WL−WR rapidly increases from the negative value, so that a value of the left-right load difference WL−WR forms a substantially V-shape (see FIG. 8).

On the other hand, in a case where an adult seated on the vehicle seat 1 engages the tongue 63 and the buckle 64 of the seat belt apparatus 6, the above-mentioned rapid increase and decrease of the total load WR+WL occurring approximately when (i.e. before and after) the buckle switch is turned on 5, the changes in the value of left-right load difference WL−WR in the V-shape and the like are not likely to occur.

Figure 4:
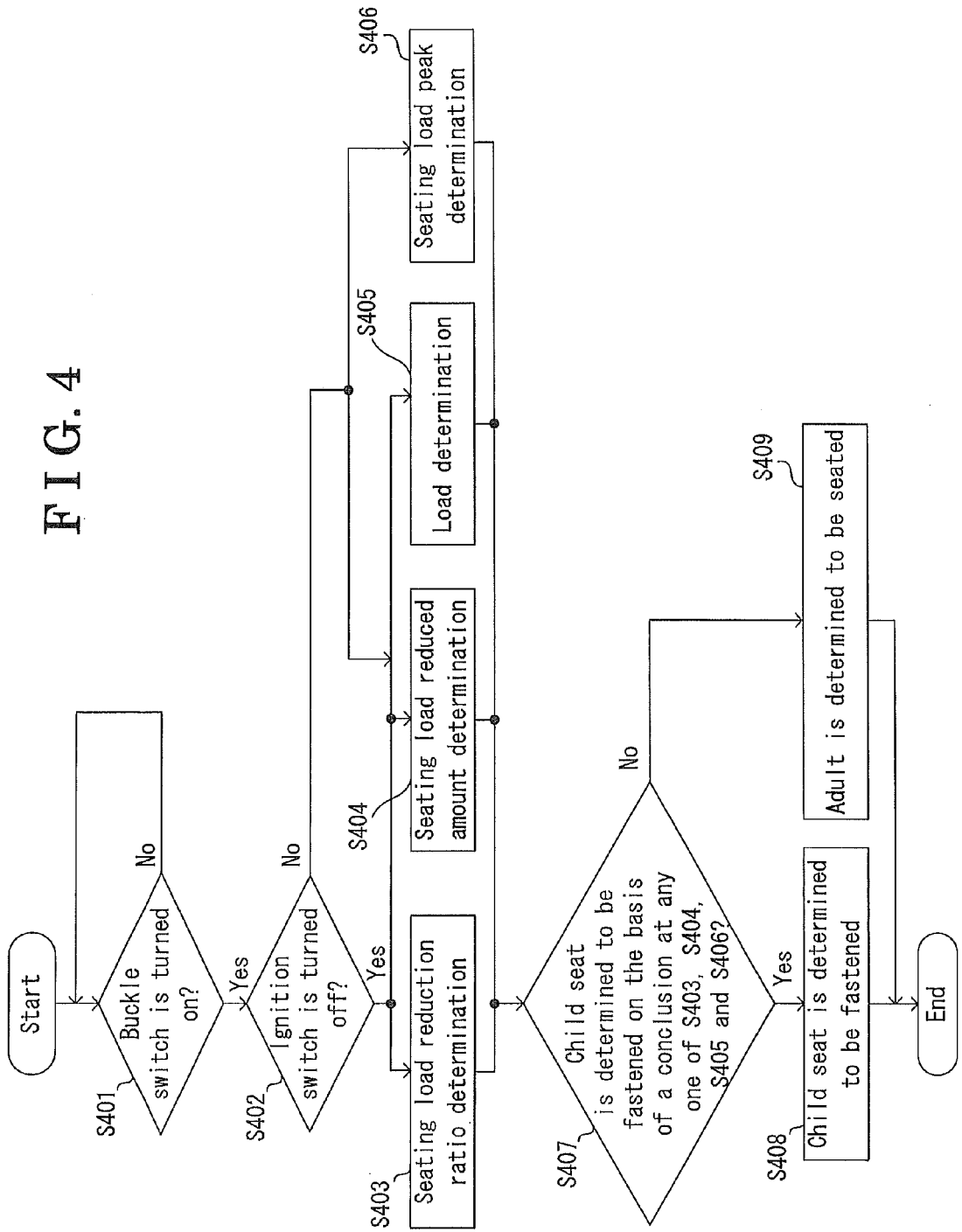
FIG. 4 is a main flowchart indicating a determination procedure executed by the seat occupancy determining apparatus illustrated in FIG. 2.
Figure 5:
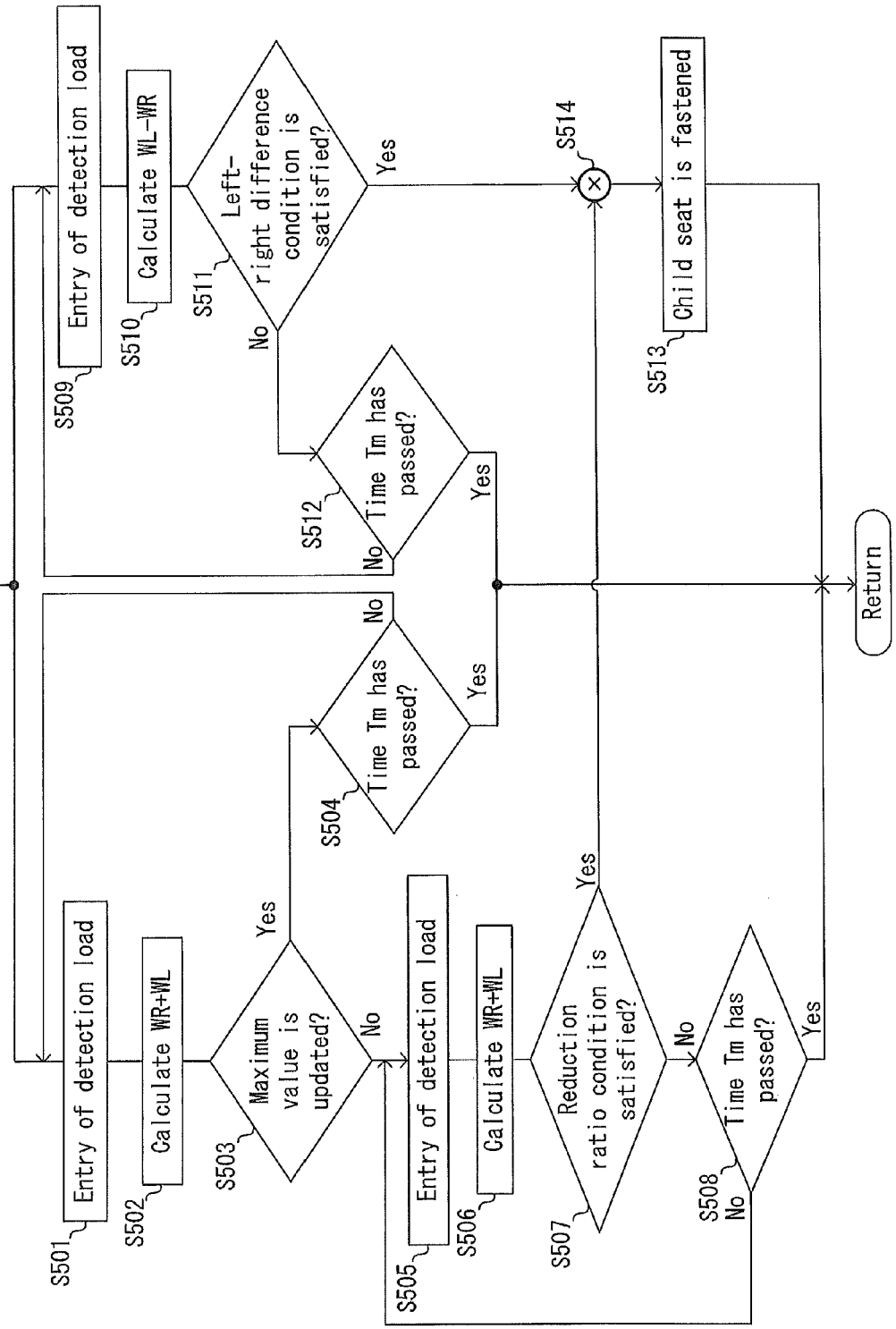
FIG. 5 is a sub-flowchart indicating a determination procedure executed in a seating load reduction ratio determination indicated in FIG. 4.
Figure 6:
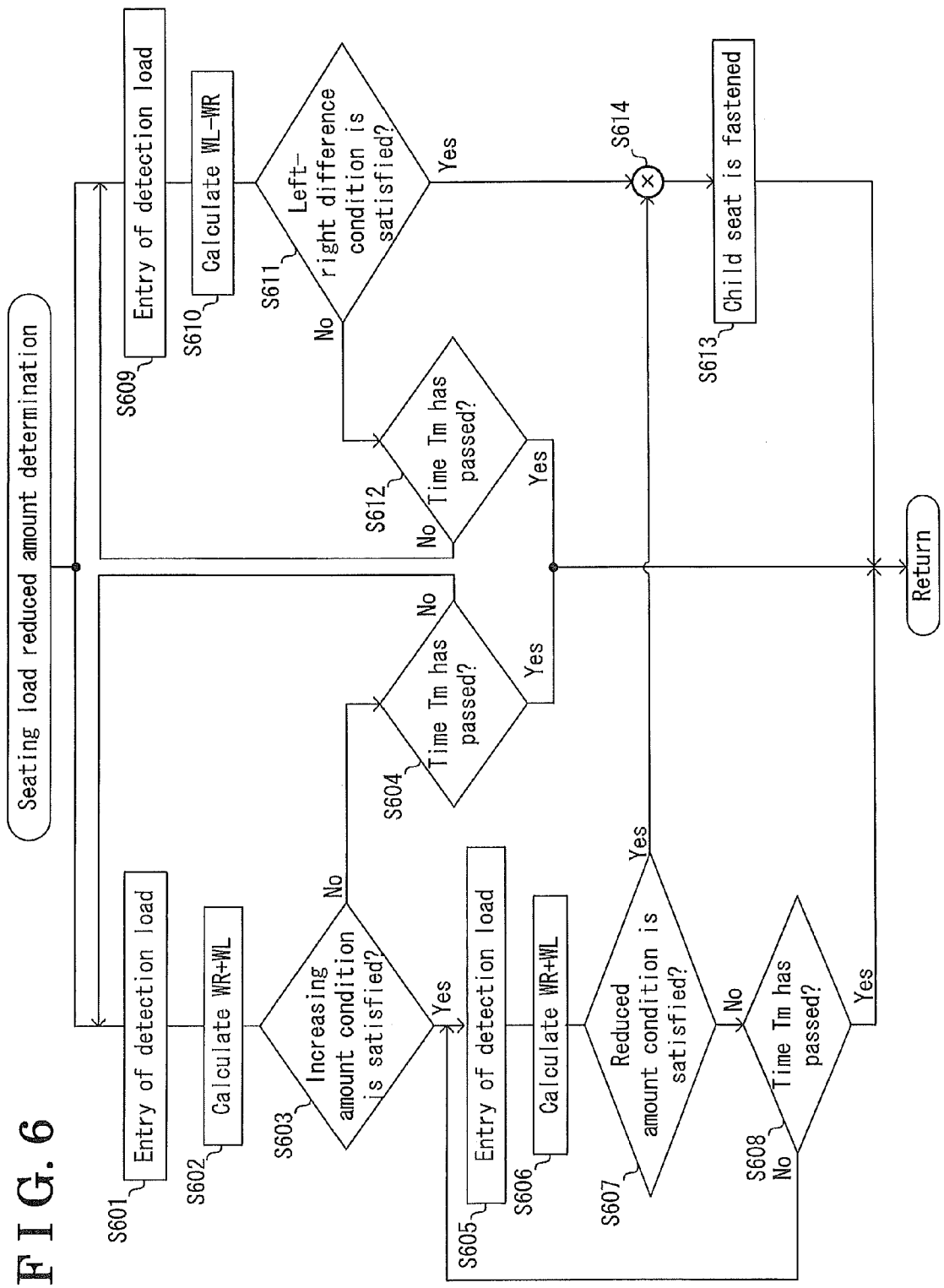
FIG. 6 is a sub-flowchart indicating a determination procedure executed in a seating load reduced amount determination indicated in FIG. 4.
Figure 7:
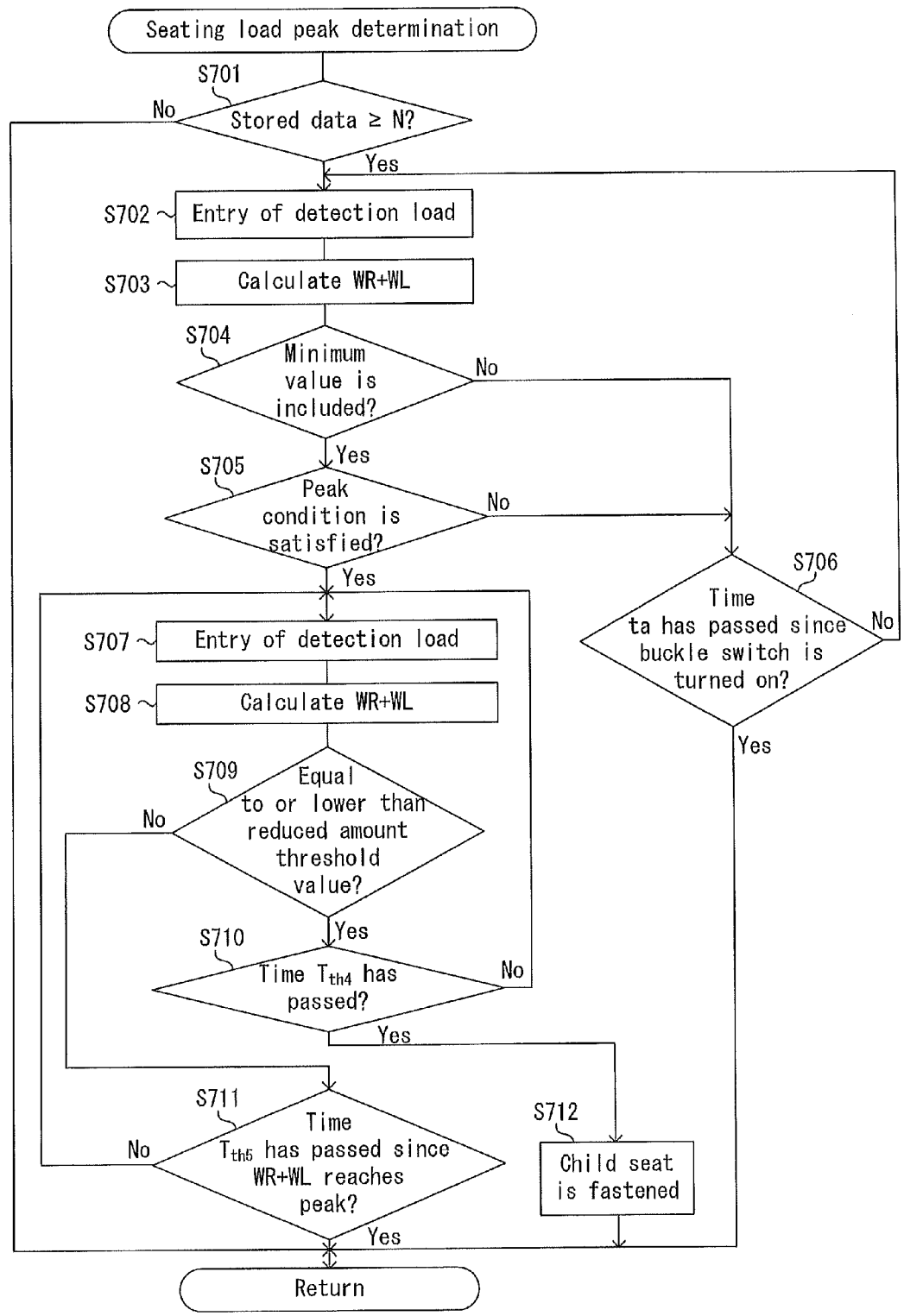
FIG. 7 is a sub-flowchart indicting a determination procedure executed in a seating load peak determination indicated in FIG. 4.

A method of detecting the seat occupancy state of the vehicle seat 1 by the controller 3 according to the embodiment will be described below with reference to FIGS. 4 to 13. Illustrated in FIG. 4 is a main flowchart illustrating a seat occupancy determining method according to the embodiment. Illustrated in FIG. 5 is a flowchart of a seating load reduction ratio determination indicated in step S403 in FIG. 4, Illustrated in FIG. 6 is a flowchart of a seating load reduced amount determination indicated in step S404 in FIG. 4. Furthermore, illustrated in FIG. 7 is a flowchart of a seating load peak determination indicated in step S406 in FIG. 4. A seating load increase and decrease determination includes the seating load reduction ratio determination illustrated in FIG. 5 and the seating load reduced amount determination illustrated in FIG. 6.

Firstly, it is determined whether or not the buckle switch 65 of the seat belt apparatus 6 of the vehicle is turned on (step S401). In this embodiment, a main controller monitors an operation state of the buckle switch 65 without being influenced by an operation state of the ignition switch 8. In a case where the main controller determines that the buckle switch 65 is turned on while the ignition switch 8 is in an off-state, the main controller activates the controller 3, so that the seat occupancy determination (i.e. the determination of the seating state of the passenger on the vehicle seat 1) is executed by the controller 3 thereafter.

In the case where the main controller determines that the buckle switch 65 is turned on (Yes in step S401), the controller 3 determines whether or not the ignition switch 8 of the vehicle is in the off-state (step S402). In a case where the controller 3 determines that the ignition switch 8 is in the off-state (Yes in step S402), the seating load reduction ratio determination (step S403), the seating load reduced amount determination (step S404) and a load determination (step S405) are simultaneously executed.

On the other hand, in a case where the controller 3 determines that the ignition switch 8 is in an on-state (No in step S402), the controller 3 simultaneously executes the seating load reduction ratio determination (step S403), the seating load reduced amount determination (step S404), the load determination (step S405) and the seating load peak determination (step S406). The seating load reduction ratio determination, the seating load reduced amount determination, the load determination and the seating load peak determination will be described in more detail below.

At step S407, the controller 3 determines whether or not the child seat 5 is determined to be fastened to the vehicle seat 1 at any one of steps S403 to S406 when the seating load reduction ratio determination (step S403), the seating load reduced amount determination (step S404) and the load determination (step S405) are terminated, or when the seating load reduction ratio determination (step S403), the seating load reduced amount determination (step S404), the load determination (step S405) and the seating load peak determination (step S406) are terminated.

In a case where the child seat 5 is determined to be fastened to the vehicle seat 1 at any one of steps S403 to S406 (Yes in step S407), the controller 3 eventually determines that child seat 5 is fastened to the vehicle seat 1 at step S408. Then, the controller 3 transmits a determination result to, for example, an air bag ECU.

On the other hand, in a case where the child seat 5 is not determined to be fastened to the vehicle seat 1 at any one of steps S403 to S406 (No in step S407), the controller 3 determines that the adult sits on the vehicle seat 1 at step S409. Then, the controller 3 transmits the determination result to the air bag ECU. In the case where the controller 3 determines that the adult is seated on the vehicle seat 1, the controller 3 transmits the control signal to the air bag ECU, so that the air bag ECU controls an air bag so as to be in a fully-deployable state. On the other hand, in the case whether the controller 3 does not determine that the adult is seated on the vehicle seat 1, the controller 3 transmits the control signal to the air bad, so that the air bag ECU controls the air bag so as not to be fully deployed.

The seating load reduction ratio determination, which is indicated at step S403, will be described below with reference to FIGS. 5, 8 and 10. As is described above, the seating load reduction ratio determination is executed in any case where the ignition switch 8 is in the on-state or in the off-state at the time when the buckle switch 65 is turned on. Additionally, the process from step S501 to step S508 and the process from step S509 to step S512 in FIG. 5 are simultaneously executed. Furthermore, a connection point P514 in FIG. 5 indicates that a step S513 is executed in a case where the process reaches the connection point P514 from step S507 and step S511.

In the seating load reduction ratio determination, firstly, the loads WR and WL are inputted into the controller 3 from the corresponding seat occupancy detecting sensors 2R and 2L (steps S501 and S509). Then, the controller 3 simultaneously calculates the total load WR+WL and the left-right load difference WL−WR on the basis of the loads WR and WL, which are detected after the buckle switch 65 is turned on (steps S502 and S510).

When the total load WR+WL is calculated, a maximum value of the total load WR+WL is updated (step S503). More specifically, in a case where the total load WR+WL, which is calculated in a current cycle of the process, is greater than the total load WR+WL, which is calculated in a previous cycle of the process, the maximum value of the total load WR+WL is updated. However, the total load WR+WL, which is calculated in a first cycle of the process, is not updated in this embodiment.

After the maximum value of the total load WR+WL is updated, the controller 3 determines whether or not a predetermined time Tm has passed since the buckle switch 65 is turned on (step S504). In a case where the predetermined time Tm has elapsed since the buckle switch 65 is turned on (Yes in step S504), the seating load reduction ratio determination is terminated. On the other hand, in a case where the predetermined time Tm has not passed since the buckle switch 65 is turned on (No in step S504), the loads WR and WL, which are newly detected, are inputted into the controller 3 (step S501), the total load WR+WL is calculated (step S502), and then, the maximum value of the total load WR+WL is, again, updated at step S503. Accordingly, by repeatedly updating the maximum value of the calculated total value WR+WL, a peak point $P_{max}$, which corresponds to a maximum load value $W_{max}$ of the total load WR+WL, is formed (see FIG. 8).

In a case where the total load WR+WL, which is calculated in the current cycle of the process, becomes equal to or lower than the total load WR+WL, which is obtained in the previous cycle of the process, and the maximum value is not updated (No in step S503), the loads WR and WL are newly inputted into the controller 3 (step S505), the total load WR+WL is calculated (step S506) and then, the controller 3 determines whether or not a reduction ratio condition of the seating load is satisfied (step S507). More specifically, at step S507, the controller 3 determines whether or not a state of the total load WR+WL being lower than a value $W_{max}/R_{te}$, which is obtained by dividing the maximum load value $W_{max}$ (which corresponds to a total load reference value) by a predetermined coefficient $R_{te}$, continues for a first threshold time $T_{th1}$ (FIG. 8). In a case where the reduction ratio condition is satisfied (Yes in step S507), the process proceeds to the connection point P514.

On the other hand, in a case where the reduction ratio condition is not satisfied (No in step S507), the controller 3 determines whether or not the predetermined time Tm has passed since the buckle switch 65 is turned on (step S508). In a case where the predetermined time Tm has not passed since the buckle switch 65 is turned on (No in step S508), the loads WR and WL are newly inputted into the controller 3 (step S505), the total load WR+WL is calculated (step S506), and then, the controller 3 determines once more whether or not the reduction ratio condition is satisfied at step S507. On the other hand, in a case where the predetermined time Tm has passed since the buckle switch 65 is turned on (Yes in step S508), the seating load reduction ratio determination is terminated.

After the left-right load difference WL−WR is calculated on the basis of the loads WR and WL, which are detected by the corresponding right and left seat occupancy detecting sensors 2R and 2L after the buckle switch 65 is turned on (step S510), the controller 3 determines whether or not a left-right difference condition of the seating load is satisfied (step S511). More specifically, at step S511, the controller 3 determines whether or not a state of a minimum load value $W_{btm}$ (which is a negative value and which corresponds to a minus reference value), which is formed after the buckle switch 65 is turned on, being increased by a predetermined load amount $W_{in}$ or more continues for a second threshold time $T_{th2}$ (see FIG. 8). In a case where the left-right difference condition is satisfied (Yes in step S511), the process proceeds to the connection point P514.

In the case where the reduction ratio condition is not satisfied, the controller 3 determines whether or not the predetermined time Tm has elapsed since the buckle switch 65 is turned on (step S512). In a case where the predetermined time Tm has not elapsed since the buckle switch 65 is turned on (No in step S512), the loads WR and WL are newly inputted into the controller 3 (step S509), the left-right load difference WL−WR is calculated (step S510), and then, the controller 3 once again determines whether or not the left-right difference condition is satisfied at step S511. On the other hand, in a case where the predetermined time Tm has passed since the buckle switch 65 is turned on, the seating load reduction ratio determination is terminated. In a case where the reduction ratio condition is satisfied at step S507 (Yes in step S507) and where the left-right difference condition is satisfied at step S511 (Yes in step S511), the controller 3 determines that the child seat 5 is fastened to the vehicle seat 1 (step S513).

Figure 8:
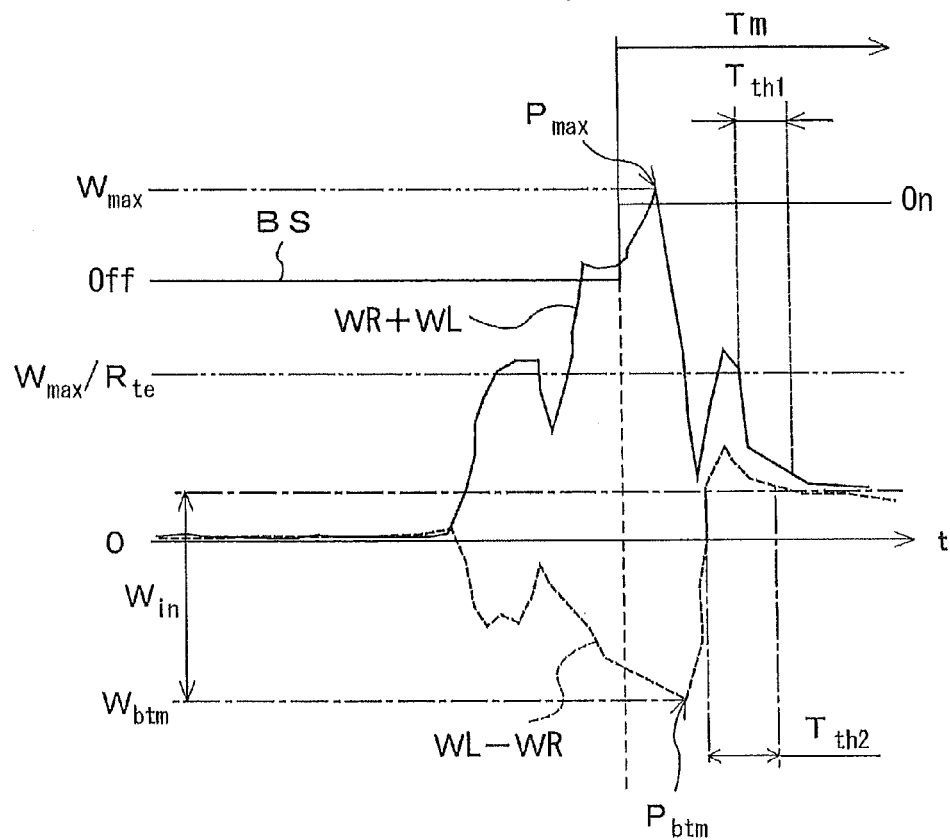
FIG. 8 is a diagram illustrating a state of a seating load acting on the vehicle seat for explaining the determination method adapted to the seating load reduction ratio determination.

Illustrated in FIG. 8 is the case where the total load WR+WL reaches the peak point $P_{max}$ after the buckle switch 65 is turned on. The method (the procedure) of determining the seating load reduction ratio in a case where the total load WR+WL forms the peak point $P_{max}$ before the buckle switch 65 is turned on will be described below with reference to FIG. 9.

In a case where the total load WR+WL has already become lower than the peak point $P_{max}$ at the time when the buckle switch 65 is turned on, the total load WR+WL is not likely to increase. Therefore, the maximum value of the total load WR+WL is not updated at step S503 (see FIG. 5). Accordingly, the controller 3 determines whether or not the reduction ratio condition of the seating load is satisfied (step S507) after the loads WR and WL are newly inputted into the controller 3 (step S505) and the total load WR+WL is calculated (step S506).

Figure 9:
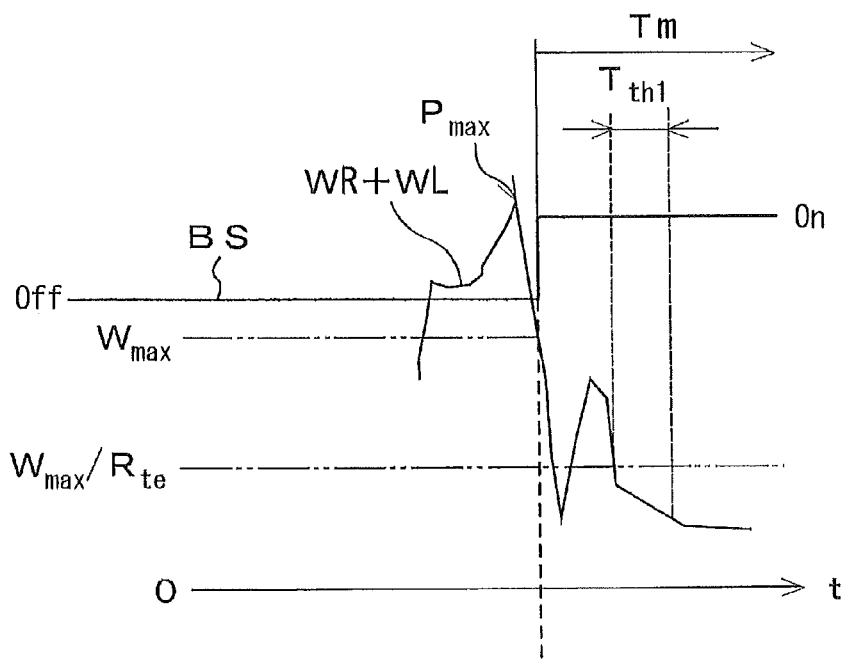
FIG. 9 is a diagram for explaining a determination method adapted to the seating load reduction ratio determination in a case where a total load reaches a peak before a buckle and a tongue of a seat belt are engaged.

More specifically, at step S507 in this case, the controller 3 determines whether or not a state of the total load WR+WL being lower than the value $W_{max}/R_{te}$ continues for the first threshold time $T_{th1}$ (see FIG. 9). The value $W_{max}/R_{te}$ is obtained by dividing the maximum load value $W_{max}$, which corresponds to the value of the total load WR+WL to be obtained at the time when the buckle switch 65 is turned on (i.e. the total load reference value), by the predetermined coefficient $R_{te}$.

The seating load reduction ratio determination in the case where the left-right load difference WL−WR forms a minimum point $P_{btm}$ before the buckle switch 65 is turned on will be described below with reference to FIG. 10. In a case where the left-right load difference WL−WR has already reached the minimum point $P_{btm}$ when (i.e. before) the buckle switch 65 is turned on, the controller 3 determines whether or not the left-right difference condition of the seating load is satisfied (step S511) after the loads WR and WL are inputted thereinto (step S509) and the total load WR+WL is calculated (step S510) (see FIG. 5).

Figure 10:
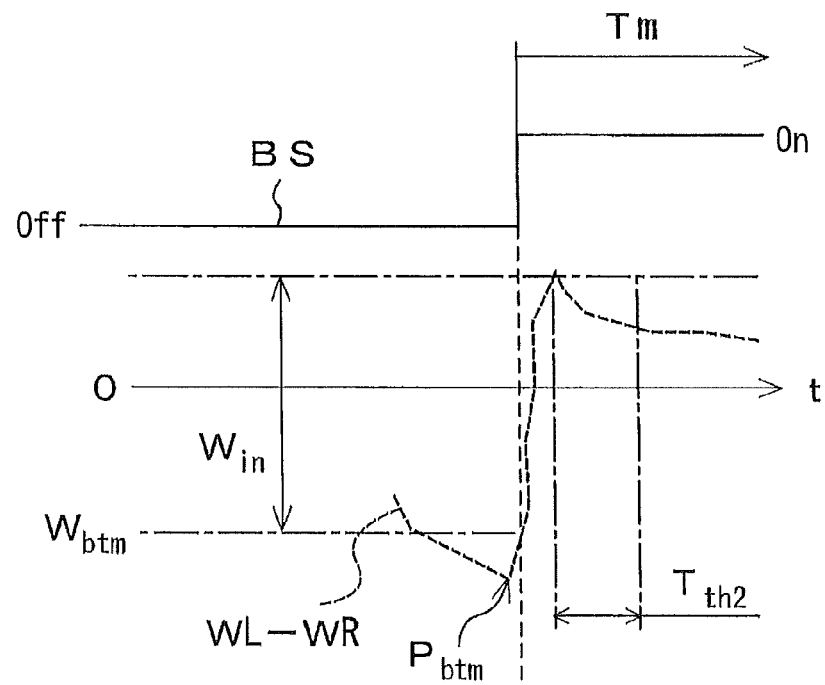
FIG. 10 is a diagram for explaining a determination method adapted to the seating load reduction ratio determination in a case where a left-right load difference forms a minimum value before the buckle and the tongue of the seat belt are engaged.

More specifically, at step S511, the controller 3 determines whether or not a state of the left-right load difference WL−WR being increased by the predetermined load amount $W_{in}$ or more from the minimum load value $W_{btm}$, which corresponds to the value of the left-right load difference WL−WR to be obtained when the buckle switch 65 is turned on (i.e. a minus reference value), continues for the second threshold time $T_{th2}$ (see FIG. 10). In the case of the state illustrated in FIG. 10, the left-right load difference WL−WR does not increase by the predetermined load amount $W_{in}$ or more. Therefore, the controller 3 determines that the left-right difference condition is not satisfied.

Figure 11:
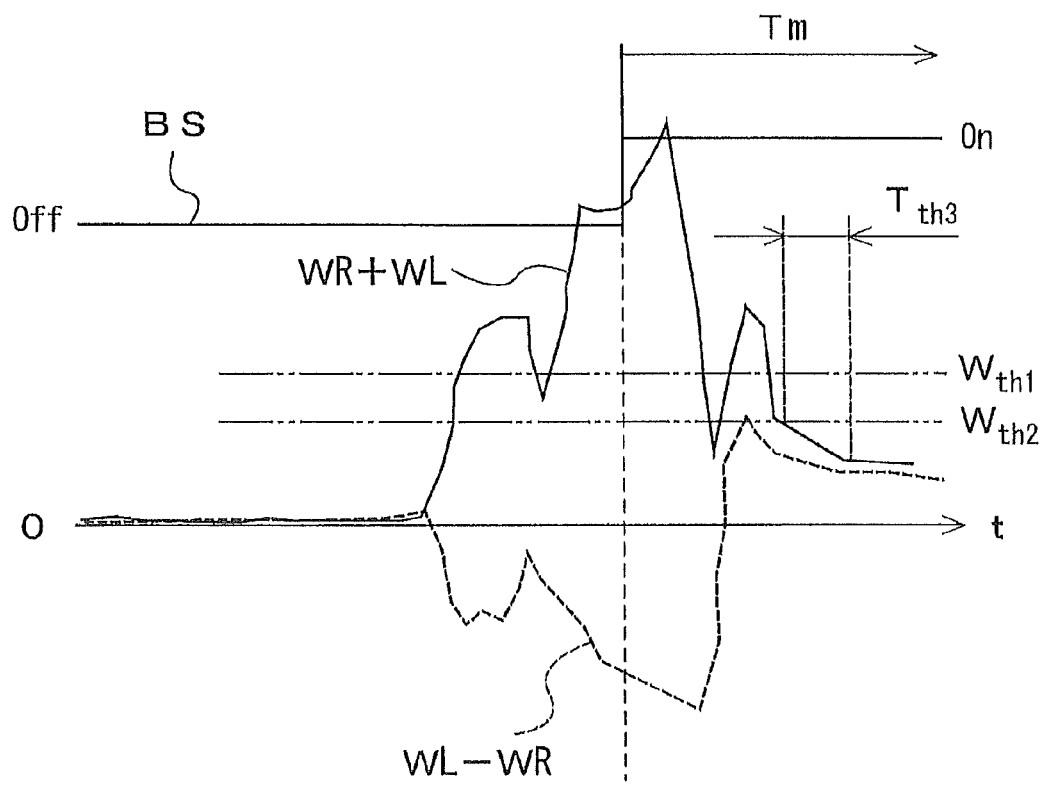
FIG. 11 is a diagram indicating a state of the seating load acting on the vehicle seat for explaining the determination method adapted to the seating load reduced amount determination.
Figure 12:
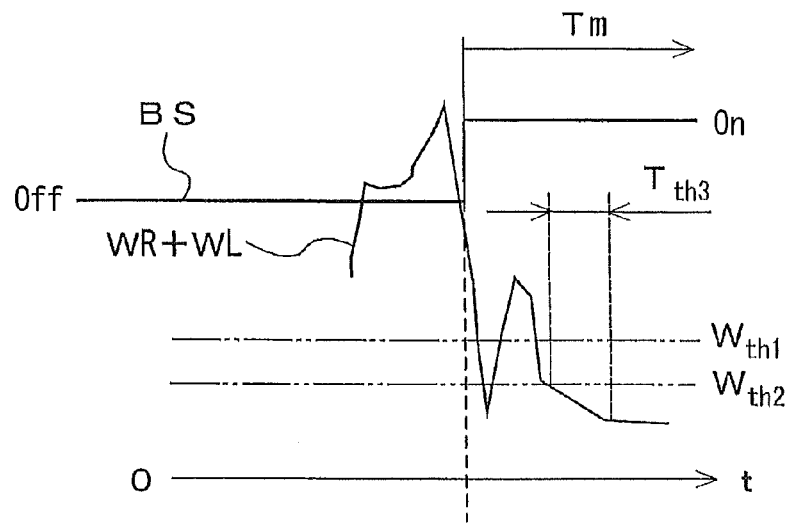
FIG. 12 is a diagram for explaining a determination method adapted to the seating load reduced amount determination in the case where the total load forms the peak before the buckle and the tongue of the seat belt are engaged.

The seating load reduced amount determination indicated at step S404 will be described below with reference to FIGS. 6, 11 and 12. As described above, the seating load reduced amount determination is executed, without being influenced by whether the ignition switch 8 is in the on-state or in the off-state at the time when the buckle switch 65 is turned on. In the seating load reduced amount determination, the process from step S601 to step S608 and the process from step S609 to step S608 in FIG. 6 are simultaneously executed. A connection point P614 in FIG. 6 indicates that the process at step S613 is executed in a case where the process reaches the connection point P614 from both of step S607 and step S611.

As is the case with the seating load reduction ratio determination, the loads WR and WL detected by the corresponding seat occupancy detecting sensors 2R and 2L are inputted into the controller 3 (steps S601 and S609). Then, the controller 3 simultaneously calculates the total load WR+WL and the left-right load difference WL−WR on the basis of the loads WR and WL detected after the buckle switch 65 is turned on (steps S602 and S610).

After the total load WR+WL is calculated, the controller 3 determines whether or not an increasing amount condition of the seating load is satisfied (step S603). More specifically, at step S603, the controller 3 determines whether or not the total load WR+WL becomes equal to or greater than a first threshold load $W_{th1}$ (see FIG. 11). In a case where the increasing amount condition is satisfied (Yes in step S603), the loads WR and WL are newly inputted into the controller 3 (step S605), the total load WR+WL is calculated (step S606) and then, the controller 3 determines whether or not a reduced amount condition is satisfied (step S607). More specifically, at step S607, the controller 3 determines whether or not a state of the total load WR+WL being equal to or lower than a second threshold load $W_{th2}$ continues for a third threshold time $T_{th3}$ (see FIG. 11). In a case where the reduced amount condition is satisfied (Yes in step S607), the process proceeds to the connection point P614.

In a case where the increasing amount condition is not satisfied (No in step S603), the controller 3 determines whether or not the predetermined time Tm has passed since the buckle switch 65 is turned on (step S604). In a case where the predetermined time Tm has not passed (No in step S604), the loads WR and WL are newly inputted into the controller 3 (step S601), the total load WR+WL is calculated (step S602), and then, the controller 3 determines once more whether or not the increasing amount condition is satisfied at step S603. On the other hand, in a case where the predetermined time Tm has elapsed since the buckle switch 65 is turned on (Yes in step S604), the seating load reduced amount determination is terminated.

In a case where the reduced amount condition is not satisfied (No in step S607), the controller 3 determines whether or not the predetermines time Tm has passed since the buckle switch 65 is turned on (step S608). In a case where the predetermined time Tm has not passed (No in step S608), the loads WR and WL are newly inputted into the controller 3 (step S605), the total load WR+WL is calculated (step S606) and then, the controller 3 again determines whether or not the reduced amount condition is satisfied at step S607. On the other hand, in a case where the predetermined time Tm has passed (Yes in step S608), the seating load reduced amount determination is terminated. The process from step S609 to S612 in the seating load reduced amount determination indicated in FIG. 6 is similar to the process from step S509 to step S512 in the seating load reduction ratio determination indicated in FIG. 5. Therefore, the detailed explanation of the process from step S609 to S612 is omitted.

As is the case with the seating load reduction ratio determination, in a case where the reduced amount condition is satisfied at step S607 (Yes in S607) and where the left-right difference condition is satisfied at step S611 (Yes in S611), the controller 3 determines that the child seat 5 is fastened to the vehicle seat 1 (step S613). The predetermined time Tm used in the seating load reduction ratio determination and in the seating load reduced amount determination is set to be relatively longer when comparing to the first threshold time $T_{th1}$, the second threshold time $T_{th2}$ and the third threshold time $T_{th3}$.

As described above, illustrated in FIG. 11 is the case where the total load WR+RL forms the peak point after the buckle switch 65 is turned on. However, even in the case where the total load WR+WL forms the peak point before the buckle switch 65 is turned on, as indicated in FIG. 12, the controller 3 determines whether or not the increasing amount condition and the reduced amount condition are satisfied.

In other words, in this embodiment, the controller 3 determines that the increasing amount condition is satisfied in the case where the total load WR+WL becomes equal to or greater than the first threshold load $W_{th1}$ without being influenced by a timing when the total load WR+WL reaches the peak point. Furthermore, the controller 3 determines that the decreased amount condition is satisfied in the case where the state of the total load WR+WL being equal to or lower than the second threshold load $W_{th2}$ continues for the third threshold time $T_{th3}$, without being influenced by the timing when the total load WR+WL forms the peak point (see FIG. 12).

The load determination indicated at step S405 will be described below. As described above, the load determination is executed without being influenced by whether the ignition switch 8 is in the on-state or in the off-state at the time when the buckle switch 65 is turned on. In the load determination, the controller 3 determines that the child seat 5 is fastened to the vehicle seat 1 in a case where a state of the total load WR+WL being lower than a predetermined load value continues for a predetermined time after the buckle switch 65 is turned on.

The seating load peak determination indicated at step S406 will be described below with reference to FIGS. 7 and 13. As described above, the seating load peak determination is executed in the case where the ignition switch 8 is in the on-state at the time when the buckle switch 65 is turned on.

In the seating load peak determination, firstly, the controller 3 determines whether or not a predetermined number N of data or greater than the predetermined number N of data relating to the total load WR+WL (e.g. a pair of data relating to the loads WR and WL detected by the corresponding seat occupancy detecting sensors 2R and 2L) is stored within a memory of the controller 3 (step S701). In this embodiment, the data relating to the total load WR+WL are generated at predetermined time intervals. Therefore, the predetermined number N or greater than the predetermined number N of the data relating to the total load WR+WL being stored within the memory of the controller 3 (Yes in step S701) indicates that all of the data relating to the total load WR+WL obtained during a predetermined time ta (i.e. an approximate time, a predetermined time duration before the buckle switch 65 is turned on (see FIG. 13)) before the buckle switch 65 is turned on is stored within the memory.

For example, in a case where the predetermined time ta has not passed until the buckle switch 65 is turned on since the ignition switch 8 had been turned on and where the controller 3 determines that the predetermined number N or greater than the predetermined number N of the data relating to the total load WR+WL is not stored within the memory, the seating load peak determination is terminated. Additionally, the above-mentioned approximate time is set so as to have a predetermined time duration with reference to the time when the buckle switch 65 is turned on. In other words, the approximate time corresponds to the predetermined time duration including when (before and after) the buckle 64 is engaged with the tongue 63.

In the case where the controller 3 determines that the predetermined number N or greater than the predetermined number N of the data relating to the total load WR+WL is stored within the memory (Yes in step S701), the loads WR and WL are newly inputted into the controller 3 (step S702) and then, the controller 3 calculates the total load WR+WL (step S703). Then, the controller 3 determines whether or not the minimum load value $W_{min}$, which is equal to or greater than the third threshold load $W_{th3}$, is included in the data relating to the total load WR+WL obtained before the buckle switch 65 is turned on and in the data relating to the total load WR+WL obtained after the buckle switch 65 is turned on (step S704, see FIG. 13). In a case where the controller 3 determines that the minimum load value $W_{min}$ is not included in the data relating to the total load WR+WL (No in step S704), the process proceeds to step S706 where the controller 3 determines whether or not the predetermined time ta (i.e. the approximate time after the buckle switch 65 is turned on 65 (see FIG. 13)) has elapsed since the buckle switch 65 is turned on.

In a case where the predetermined time ta has not passed since the buckle switch 65 is turned on, the loads WR and WL are newly inputted into the controller 3 (step S702), the total load WR+WL is calculated (step S703), and then, the controller 3 once again determines whether or not the minimum load value $W_{min}$ is included in the data at step S704. On the other hand, in a case where the controller 3 determines that predetermined time ta has passed since the buckle switch 65 is turned on (Yes in step S706), the seating load peak determination is terminated.

In a case where the controller 3 determines that the minimum load value $W_{min}$ is included in the data relating to the total load WR+WL (Yes in step S704), the minimum load value $W_{min}$ is stored within the controller 3. Then, the controller 3 determines whether or not a peak condition of the seating load is satisfied at step S705. More specifically, at step S705, the controller 3 determines whether or not the maximum load value $W_{max}$, which is equal to or greater than the minimum load value $W_{min}$ by a predetermined load amount $W_{as}$, is included in the stored data relating to the total load WR+WL obtained before the buckle switch 65 is turned on or in the stored data relating to the total load WR+WL obtained after the buckle switch 65 is turned on (see FIG. 13).

Figure 13:
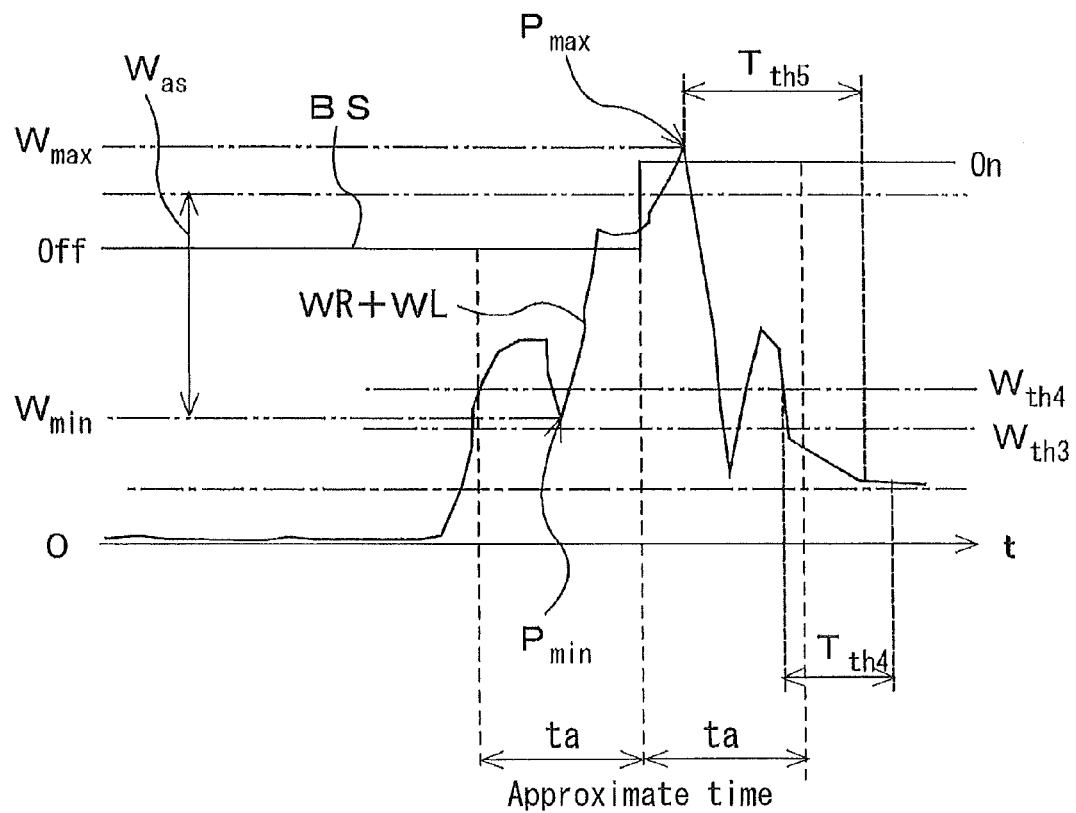
FIG. 13 is a diagram illustrating a state of the seating load acting on the vehicle seat for explaining the determination method adapted to the seating load peak determination.

Accordingly, in the seating load peak determination, the controller 3 may determine that the peak condition is satisfied even in the case where the total load WR+WL forms the peak point $P_{max}$, at which the value of the total load WR+WL becomes the maximum load value $W_{max}$, before the buckle switch 65 is turned on, unlike in the case indicated in FIG. 13. Therefore, in a case where the controller 3 determines that the peak condition is not satisfied (No in step S705), the process proceeds to step S706 where the controller 3 determines whether or not the predetermined time ta has elapsed since the buckle switch 65 is turned on.

In the case where the predetermined time ta has not passed (No in step S706), the loads WR and WL are newly inputted into the controller 3 (step S702), the total load WR+WL is calculated (step S703), and then, the controller 3 again determines whether or not the peak condition is satisfied at step S705. In this case, because the minimum load value $W_{min}$ is stored within the controller 3, the process executed at step S704 is skipped. On the other hand, in the case where the predetermined time ta has passed since the buckle switch 65 is turned on (Yes in step S706), the seating load peak determination is terminated. In this embodiment, the approximate time before the buckle switch 65 is turned on and the approximate time after the buckle switch 65 is turned on are set to be the same (i.e. the time ta). In other words, the approximate time before the buckle switch 65 is set so as to have the same time duration as the approximate time after the buckle switch 65 is turned on. However, the approximate time before the buckle switch 65 is turned on and the approximate time after the buckle switch 65 is turned on may be set to differ from each other.

In a case where the controller 3 determines that the peak condition is satisfied at step S705 (Yes in step S705), the loads WR and WL are newly inputted into the controller 3 (step S707), the total load WR+WL is calculated (step S708), and then, the controller 3 determines whether or not the total load WR+WL is equal to or lower than a fourth threshold load $W_{th4}$, which serves as a reduced amount threshold value (step S709, see FIG. 13). In a case where the controller 3 determines that the total load WR+WL is equal to or lower than the fourth threshold load $W_{th4}$ (Yes in step S709), the controller 3 determines whether or not a state of the total load WR+WL being equal to or lower than the fourth threshold load $W_{th4}$ continues for a fourth threshold time $T_{th4}$ (step S710, see FIG. 13).

In a case where the controller 3 determines that the state where the total load WR+WL being equal to or lower than the fourth threshold load $W_{th4}$ continues for the fourth threshold time $T_{th4}$ (Yes in step S710), the controller 3 determines that the child seat 5 is fastened to the vehicle seat 1 (step S712). On the other hand, in a case where the controller 3 determines that the state where the total load WR+WL being equal to or lower than the fourth threshold load $W_{th4}$ does not continue for the fourth threshold time $T_{th4}$ (No in step S710), the loads WR and WL are newly inputted into the controller 3 (step S707), the total load WR+WL is calculated (step S708), and then, the controller 3 once again determines whether or not the total load WR+WL is equal to or lower than the fourth threshold load $W_{th4}$ at step S709. In a case where the controller 3 determines that the total load WR+WL is not equal to or lower than the fourth threshold load $W_{th4}$ at step S709 (No in step S709), the process proceeds to step S711 where the controller 3 determines whether or not a fifth threshold time $T_{th5}$ has elapsed since the total load WR+WL forms the peak point $P_{max}$, which corresponds to the maximum load value $W_{max}$ (see FIG. 13).

In a case where the controller 3 determines that the fifth threshold time $T_{th5}$ has passed since the total load WR+WL reaches the peak point $P_{max}$ (Yes in step S711), the seating load peak determination is terminated. On the other hand, in a case where the fifth threshold time $T_{th5}$ has not passed since the total load WR+WL forms the peak point $P_{max}$ (No in step S711), the process returns to step S707 where the loads WR and WL are newly inputted into the controller 3, the total load WR+WL is calculated (step S708), and then, the controller 3 determines whether or not the total load WR+WL is equal to or lower than the fourth threshold load $W_{th4}$ at step S709.

As is described above, in the seating load reduction ratio determination, the seating load reduced amount determination and in the seating load peak determination according to the embodiment, a condition (which will be herein after referred to as a total condition) used for the controller 3 to determine whether or not the child seat 5 is fastened to the vehicle seat 1 is set on the basis of a characteristic (i.e. a chancing characteristic) of the total load WR+WL.

In the seating load reduction ratio determination according to the embodiment, a continuation of the state where the total load WR+WL being lower than the value $W_{max}/R_{te}$, which is obtained by dividing the maximum load value $W_{max}$ by the predetermined coefficient $R_{te}$, for the first threshold time $T_{th1}$ during the predetermined time Tm after the state of the buckle switch 65 is switched from the off-state to the on-state is used as the total condition.

In the seating load reduced amount determination according to the embodiment, the total condition used for the controller 3 to determine whether or not the child seat 5 is fastened to the vehicle seat 1 is set on the basis of the characteristic of the total load WR+WL. In this case, an increase of the total load WR+WL by the first threshold load $W_{th1}$ or more and a continuation of the total load WR+WL being equal to or lower than the second threshold load $W_{th2}$ for the third threshold time $T_{th3}$ after the increase of the total load WR+WL within the predetermined time Tm after the state of the buckle switch 65 is switched from the off-state to the on-state are used as the total condition.

In the seating load peak determination according to the embodiment, the total condition used for the controller 3 to determine whether or not the child seat 5 is fastened to the vehicle seat 1 is set on the basis of the characteristic of the total load WR+WL. More specifically, in the seating load peak determination, the total load WR+WL reaching the maximum load value $W_{max}$, which is greater than the minimum load value $W_{min}$, being greater than the third threshold load $W_{th3}$, by equal to or greater than the predetermined load amount $W_{as}$ and the state where the total load WR+WL being equal to or lower than the fourth threshold load $W_{th4}$ being continued for the fourth threshold time $T_{th4}$ within the fifth threshold time $T_{th5}$ after the total load WR+WL forms the peak point $P_{max}$ corresponding to the maximum load value $W_{max}$ at the time approximately when the state of the buckle switch 65 is switched to the on-state from the off-state (i.e. the approximate time is the predetermined time duration to surrounding the time when the state of the buckle switch 65 is switched to the on-state from the off-state) are used as the total condition. However, the total condition is considered to be satisfied even in the case where the state of the total load WR+WL being equal to or lower than the fourth threshold load $W_{th4}$ continues for the fourth threshold time $T_{th4}$ after the fifth threshold time $T_{th5}$, which is set so as to have a predetermined time duration after the total load WR+WL reaches the peak point $P_{max}$, has passed, as long as the total load WR+WL becomes equal to or lower than the fourth threshold load $W_{th4}$ during the fifth threshold time $T_{th5}$.

In the seating load reduction ratio determination and the seating load reduced amount determination according to the embodiment, the left-right difference condition, which is used for the controller 3 to determine whether or not the child seat 5 is fastened to the vehicle seat 1, is set on the basis of a characteristic (a changing characteristic) of the left-right load difference WL−WR. More specifically, the state where the left-right load difference WL−WR being increased by the predetermined load amount $W_{in}$ or more from the minimum load value $W_{btm}$ is continued for the second threshold time $T_{th2}$ within the predetermined time Tm after the time when the state of the buckle switch 65 is switched to the on-state from the off-state, is set as the left-right difference condition.

As illustrated in FIG. 14, in a case where, for example, an adult passenger seated on the vehicle seat 1 stoops forward, the total load WR+WL may slightly fluctuate. However, a sharp peak characteristic of the total load WR+WL is not likely to be generated. Therefore, in this case, the above-mentioned total condition is not likely to be satisfied. Furthermore, the left-right load difference WL−WR is not likely to be fluctuated by a movement of the passenger on the vehicle seat 1. Therefore, in this case, the above-mentioned left-right difference condition is not likely to be satisfied. Accordingly, the fastening of the child seat 5 on the vehicle seat 1 may be accurately determined in distinction from a determination of the passenger on the vehicle seat 1 by determining whether or not the total condition or the left-right difference condition is satisfied.

According to the embodiment, the controller 3 determines whether or not the state where the left-right load difference WL−WR being increased by the predetermined load amount $W_{in}$ or more from the minimum load value $W_{btm}$, which is set as a negative value, is continued for the second threshold time $T_{th2}$ or longer after the buckle switch 65 is turned on, is satisfied in order to determine whether or not the child seat 5 is placed on the vehicle seat 1 and the vehicle seat 1 is in a child seat fastened state, where the child seat 5 is fastened to the vehicle seat 1 by means of the seat belt apparatus 6. Accordingly, the controller 3 accurately determines that the vehicle seat 1 is in the child seat fastened state on the basis of a detection of relaxation of the load applied to the right portion of the seat cushion 11 in the right-left direction.

The child seat 5 is fastened to the vehicle seat 1 in a manner where the child seat 5 is placed on the vehicle seat 1, the seat belt apparatus 6 is fastened around the child seat 5, and the buckle 64 is pressed in the downward direction in order to engage the tongue 63 with the buckle 64. Therefore, the seating load applied to the right portion of the seat cushion 11 in the right-left direction where the buckle 64 is provided rapidly increases when comparing to the seating load applied to the left side of the seat cushion 11 in the right-left direction where the buckle 64 is not provided. After the fastening of the child seat 5 on the vehicle seat 1 is completed, the pressing force applied to the buckle 64 is eased. Therefore, imbalance between the seating loads applied to the right side portion and the left side portion of the vehicle cushion 11 is eliminated. In this embodiment, the controller 3 detects the elimination of the imbalance between the seating loads at the right side portion and the left side portion of the seat cushion 11 after the fastening of the child seat 5 on the vehicle seat 1 is completed in the manner where the controller 3 detects the fluctuation of the left-right load difference WL−WR. Accordingly, the controller 3 accurately detects the fastening of the child seat 5 on the vehicle seat 1.

In this case, after the fastening of the seat belt apparatus 6 around the child seat 5 is completed, the detachment load of pulling the seat cushion 11 in the upward direction acts thereon via the shoulder strap 61. Therefore, the above-mentioned predetermined load amount $W_{in}$ (see FIG. 8) may be set as a greater value in response to the detachment load acting on the seat cushion 11, so that the controller 3 accurately detects whether or not the child seat 5 is fastened to the vehicle seat 1.

Furthermore, in this embodiment, the controller 3 determines whether or not the vehicle seat 1 is in the child seat fastened state on the basis of the changes in the left-right load difference WL−WR occurring after the buckle switch 65 is turned on. Therefore, even in the case where the ignition switch 8 of the vehicle is in the off-state at the time when the buckle switch 65 is turned on, the fastening of the child seat 5 to the vehicle seat 1 may be detected.

In the case of the left-right load difference WL−WR forming the minimum point $P_{btm}$ before the buckle switch 65 is turned on, the controller 3 determines that the child seat 5 is placed on the vehicle seat 1 and is fastened to the vehicle seat 1 by means of the seat belt apparatus 6 in the case where the state of the left-right load difference WL−WR being increased by the predetermined load amount $W_{in}$ or more from the minimum load value $W_{btm}$, which corresponds to the minus reference value of the left-right load difference WL−WR at the time when the buckle switch 65 is turned on, continues for the second threshold time $T_{th2}$ or longer. Accordingly, the controller 3 may accurately determine whether or not the child seat 5 is fastened to the vehicle seat 1 on the basis of a changing amount (a changing quantity) of the left-right load difference WL−WR after the buckle 64 is engaged with the tongue 63, without being influenced by the timing when the buckle switch 65 is turned on.

The controller 3 is configured so as to determine that the child seat 5 is placed on the vehicle seat 1 and the vehicle seat 1 is in the child seat fastened state where the child seat 5 is fastened to the vehicle seat 1 by means of the seat belt apparatus 6 in the case where the state of the total load WR+WL being decreased below the value $W_{max}/R_{te}$ from the maximum load value $W_{max}$ is continued for the first threshold time $T_{th1}$ or longer after the buckle switch 65 is turned on and in the case where the state of the left-right load difference WL−WR being increased by the predetermined load amount $W_{in}$ or more from the minimum load value $W_{btm}$ (i.e. the minus reference value) is continued for the second threshold time $T_{th2}$ or longer after the buckle switch 65 is turned on. Accordingly, the controller 3 may accurately determine that the vehicle seat 1 is in the child seat fastened state on the basis of the detection of a decrease of the total seating load from the peak value and the detection of the relaxation of the load applied to the right side portion of the seat cushion 11.

Generally, the total seating load applied to the vehicle seat 1 rapidly increases when the child seat 5 is placed on the vehicle seat 1 and the seat belt apparatus 6 is fastened around the child seat 5, because the buckle 64 is pressed in the downward direction in order to engage the tongue 63 with the buckle 64 of the seat belt apparatus 6. Then, after the fastening of the child seat 5 to the vehicle seat 1 is completed, the pressing force applied to the buckle 64 is eased. Therefore, the total seating load applied to the vehicle seat 1 rapidly decreases.

In this embodiment, the controller 3 is configured so as to accurately determine that the vehicle seat 1 is in the child seat fastened state in the case where the controller 3 detects the rapid decrease of the total load WR+WL when the fastening of the child seat 5 to the vehicle seat 1 is completed and the elimination of the imbalance between the seating load applied to the right side portion and the left side portion of the vehicle seat 1 by detecting the decrease of the total load WR+WL and the fluctuation of the left-right load difference WL−WR.

Furthermore, the controller 3 is configured so as to determine whether or not the vehicle seat 1 is in the child seat fastened state on the basis of the changes in the total load WR+WL and the left-right load difference WL−WR occurring after the buckle switch 65 is turned on. Therefore, the controller 3 according to the embodiment is configured so as to determine whether or not the child seat 5 is fastened to the vehicle seat 1 even if the ignition switch 8 of the vehicle is in the off-state at the time when the tongue 63 is engaged with the buckle 64.

In the case of the total load WR+WL reaching the peak point $P_{max}$ before the buckle switch 65 is turned on, the controller 3 determines that the child seat 5 is fastened to the vehicle seat 1 in the case where the state of the total load WR+WL being decreased below the value $W_{max}/R_{te}$ from the maximum load value $W_{max}$ is continued for the first threshold time $T_{th1}$ or longer and in the case where the state of the left-right load difference WL−WR being increased by the predetermined load amount $W_{in}$ or more from the minimum load value $W_{btm}$ is continued for the second threshold time $T_{th2}$ or longer. In this embodiment, the value of the total load WR+WL to be obtained at the time when the buckle switch 65 is turned on is set as the maximum load value $W_{max}$, which serves as the total load reference value. Furthermore, the value of the left-right load difference WL−WR to be obtained at the time when the buckle switch 65 is turned on is set as the minimum load value $W_{btm}$, which serves as the minus reference value. Accordingly, the controller 3 may accurately determine whether or not the child seat 5 is fastened to the vehicle seat 1 on the basis of the changes in the total load WR+WL and the left-right load difference WL−WR after the tongue 63 is engaged with the buckle 64, without being influenced by the timing when the buckle switch 65 is turned on.

In this embodiment, the seat occupancy detecting sensors 2R and 2L are provided at the corresponding upper rails 14R and 14L so as to be positioned at the rear portion of the seat cushion 11, so that the load generated by the passenger or the child seat 5 is more likely to be applied to the seat occupancy detecting sensors 2R and 2L. Therefore, even if a seat occupancy detecting sensor is not provided at a front portion of the seat cushion 11, the seat occupancy determining apparatus accurately detects the load applied to the seat cushion 11. As a result, the seat occupancy state of the vehicle seat 1 is accurately determined. Furthermore, in this case, because the number of the seat occupancy detecting sensors is reduced (i.e. because the detection of the seat occupancy state of the vehicle seat 1 is accurately executed by using the seat occupancy detecting sensors 2R and 2L arranged at the rear portion of the seat cushion 11), manufacturing costs of the vehicle seat 1 may be reduced.

More specifically, the right seat occupancy detecting sensor 2R is provided in the vicinity of the supporting portion of the buckle 64 of the seat belt apparatus 6. Therefore, the increase of the seating load generated when the tongue 63 is engaged with the buckle 64 is easily detected. Furthermore, the seat occupancy determining apparatus includes the buckle switch 65, which serves as the vehicle operation detecting portion and which detects the engagement of the tongue 63 and the buckle 64 of the seat belt apparatus 6. Therefore, the seat occupancy determining apparatus detects the changes in the seating load occurring at the timing when the tongue 63 is engaged with the buckle 64. Accordingly, the seat occupancy determining apparatus accurately determines whether or not the vehicle seat 1 is in the child seat fastened state on the basis of the changes in the detected seating load.

According to the embodiment, the seat occupancy determining apparatus determines that the child seat 5 is fastened to the vehicle seat 1 in the case where the predetermined condition is satisfied in at least one of the seating load reduction ratio determination, the seating load reduced amount determination, the load determination and the seating load peak determination. Therefore, the seat occupancy determining apparatus accurately determines whether or not the vehicle seat 1 is in the child seat fastened state on the basis of the predetermined condition(s).

Furthermore, according to the embodiment, the seating load reduction ratio determination, the seating load reduced amount determination, the load determination and the seating load peak determination are simultaneously executed. Therefore, the conclusions in seating load reduction ratio determination, the seating load reduced amount determination, the load determination and the seating load peak determination are made at approximately same timing (i.e. without causing time difference between when concluding the seating load reduction ratio determination, when concluding the reduced amount determination, when concluding the load determination and when concluding the seating load peak determination). Accordingly, the seat occupancy determining apparatus may accurately determine whether or not the vehicle seat 1 is in the child seat fastened state. Furthermore, the determination using the reduction ratio condition and the determination using the left-right load difference condition are simultaneously executed in the seating load reduction ratio determination (i.e. without causing time difference between when concluding the determination using the reduction ratio condition and when concluding the determination using the left-right difference condition). The determination using the reduced amount condition and the determination using the left-right load difference condition are simultaneously executed in the seating load reduced amount determination (i.e. without causing time difference between when concluding the determination using the reduced amount condition and when concluding the determination using the left-right difference condition). Accordingly, the seat occupancy determining apparatus may accurately determine whether or not the vehicle seat 1 is in the child seat fastened state.

[Other Embodiments]

The present invention is not limited to the above-mentioned embodiment, and the present invention may be modified or changed as follows. The seat occupancy determining apparatus may be modified so as to determine that the child seat 5 is fastened to the vehicle seat 1 in the case where the left-right difference condition is satisfied in the seating load reduction ratio determination and in the seating load reduced amount determination, without being influenced by the conclusion in the determination using the reduction ratio condition in the seating load reduction ratio determination or the conclusion in the determination using the reduced amount condition in the seating load reduced amount determination.

The determination method indicated in FIG. 4 may be modified so that the seat occupancy determination is concluded by the seating load reduction ratio determination, or by the seating load reduced amount determination. Furthermore, the determination method indicated in FIG. 4 may be modified so that either the seating load reduction ratio determination or the seating load reduced amount determination is executed at the timing when the seating load peak determination is executed.

The first threshold time $T_{th1}$ used for the reduction ratio condition in the seating load reduction ratio determination may be set to have any desired time duration. For example, the first threshold time $T_{th1}$ may be set so as to closely approximate to zero (0), so that the reduction ratio condition is determined to be satisfied in a case where the total load WR+WL is reduced to the predetermined load value $W_{max}/R_{te}$. Furthermore, The third threshold time $T_{th3}$ used for the reduced amount condition in the seating load reduced amount determination may be set to have any desired time duration. For example, the third threshold time $T_{th3}$ may be set so as to closely approximate to zero (0), so that the reduced amount condition is determined to be satisfied in a case where the total load WR+WL becomes equal to or lower than the second threshold value $W_{th2}$. The second threshold time $T_{th2}$ used for the left-right difference condition in the seating load reduction ratio determination and the seating load reduced amount determination may be set to as to have any desired time duration. For example, the second threshold time $T_{th2}$ may be set so as to closely approximate to zero (0), so that the left-right difference condition is determined to be satisfied in a case where the left-right load difference WL−WR is increased by the predetermined load amount $W_{in}$.

The seat occupancy determining apparatus and the seat occupancy determining method according to the embodiment is not limited to the vehicle seat 1 serving as the passenger seat, but the seat occupancy determining apparatus and the seat occupancy determining method according to the embodiment may be adapted to a seat arranged at a second row or a seat used as a rear seat. Additionally, a pressure sensor for detecting a pressure applied to the seat cushion 11 when the passenger sits on the vehicle seat 1 may be adapted as each of the seat occupancy detecting sensors 2R and 2L, so that the seat occupancy detecting sensors 2R and 2L detect the load applied to the seat cushion 11 on the basis of the detected pressure. Alternatively, a deformation sensor for detecting a deformation of the seat cushion 11 may be adapted as each of the seat occupancy detecting sensors 2R and 2L, so that the seat occupancy detecting sensors 2R and 2L detect the load applied to the seat cushion 11 on the basis of deformation generated at seat cushion 11 while resisting against a biasing force generated by a seat spring.

According to the embodiment, at least a pair of the seat occupancy detecting sensors 2R and 2L needs to be provided at the right side portion and the left side portion of the seat cushion 11, respectively. Therefore, the seat occupancy detecting sensors 2R and 2L may be provided at a front right portion and a front left portion of the seat cushion 11, respectively. Alternatively, the seat occupancy detecting sensor may be provided at each four corners of the seat cushion 11. Furthermore, the pair of the seat occupancy detecting sensors 2R and 2L may be provided at the front right portion and a rear left portion of the seat cushion 11, respectively, or at the front left portion and a rear right portion of the seat cushion 11, respectively.

The seat occupancy determining apparatus may be modified so as to start the seat occupancy determination on the basis of a detection of either one of a completion of an adjustment of a seat position, an opening and closing operation of a vehicle door, a switching of the ignition switch 8 to the on-state from the off-state, instead of the detection of the switching of the buckle switch 65 to the on-state from the off-state. Furthermore, the seat occupancy determining apparatus may be modified so as to reduce the load detected by the left seat occupancy detecting sensor 2L from the load detected by the right seat occupancy detecting sensor 2R in order to obtain a right-left load difference WR−WL (i.e. the load difference value), so that the seat occupancy determining apparatus determines that the child seat 5 is placed on the vehicle seat 1 and the child seat 5 is fastened to the vehicle seat 1 by means of the seat belt apparatus 6 in a case where a state of the right-left load difference WR−WL being decreased by a predetermined value from a predetermined positive value, which corresponds to a plus reference value, continues for a predetermined time duration or longer.

In the above-mentioned embodiment, the seat occupancy determining apparatus is configured so as to determine that the child seat 5 is fastened to the vehicle seat 1 at step S513 in the case where the reduction ratio condition is satisfied at step S507 and the left-right load difference condition is satisfied at step S511 in FIG. 5. Alternatively, the seat occupancy determining apparatus may be configured so as to determine that child seat 5 is fastened to the vehicle seat 1 at step S513 in a case where the reduction ratio condition is satisfied at step S507 and the left-right difference condition is satisfied at step S511 within a predetermined time. In other words, the seat occupancy determining apparatus may be configured so as to determine that the child seat 5 is not fastened to the vehicle seat 1 in a case where the reduction ratio condition and the left-right difference condition are satisfied with a time difference greater than the predetermined time duration. Accordingly, in this case, the seat occupancy determining apparatus may execute the determination further based on the characteristic of the load detected when the child seat 5 is fastened to the vehicle seat 1. As a result, an accuracy of the determination executed by the seat occupancy determining apparatus may be increased.

According to the embodiment, the seat occupancy determining apparatus is configured so as to determine that the vehicle seat 1 is in the child seat fastened state, where the child seat 5 is fastened to the vehicle seat 1 by means of the seat belt apparatus 6, in the case where a fluctuation occurs at the left-right load difference WL−WR, such as the increase of the left-right load difference WL−WR by the predetermined load amount $W_{in}$ from the minus reference value $W_{btm}$ (the negative value) or the decrease of the left-right load difference value WL−WR by the predetermined value from the plus reference value (a positive value), after a predetermined component of the vehicle (e.g. the seat belt apparatus 6) is operated. Accordingly, the seat occupancy determining apparatus may accurately determine that the vehicle seat 1 is in the child seat fastened state on the basis of the relaxation of the load applied to one of the right side portion and the left side portion of the seat cushion 11.

The child seat 5 is fastened to the vehicle seat 1 in the manner where the child seat 5 is placed on the vehicle seat 1, and the buckle 64 is pressed in the downward direction when engaging the tongue 63 with the buckle 64 of the seat belt apparatus 6 in order to fasten the seat belt apparatus 6 around the child seat 5. Therefore, the seating load applied to the right side portion of the seat cushion 11 at which the buckle 64 is provided rapidly increases when comparing to the load applied to the left side portion of the seat cushion 11 at which the buckle 64 is not provided. When the fastening of the child seat 5 to the vehicle seat 1 is completed, the pressing force applied to the buckle 64 is eased, thereby resolving the imbalance between the seating loads applied to the right side portion and the left side portion of the seat cushion 11.

According to the embodiment, the seat occupancy determining apparatus accurately determines that the vehicle seat 1 is in the child seat fastened state in the case where the seat occupancy determining apparatus detects the elimination of the imbalance between the seating load applied to the right side portion of the seat cushion 11 and the seating load applied to the left side portion of the seat cushion 11 when the fastening of the child seat 5 on the vehicle seat 1 is completed on the basis of the fluctuation of the left-right load difference WL−WR. In this case, after the fastening of the seat belt apparatus 6 around the child seat 5 is completed, the detachment load of pulling the seat cushion 11 in the upward direction acts on the seat cushion 11 via the shoulder strap 61. Therefore, the predetermined load amount $W_{in}$, which is used as the threshold value having a predetermined fluctuation range, may be set as a greater value in response to the detachment load acting on the seat cushion 11, so that the seat occupancy determining apparatus accurately determine whether or not the child seat 5 is fastened to the vehicle seat 1.

Furthermore, the seat occupancy determining apparatus is configured so as to determine whether or not the vehicle seat 1 is in the child seat fastened state on the basis of the changes in the left-right load difference value WL−WR occurring after the seat belt apparatus 6 is operated. Therefore, even if the ignition switch 8 is in the off-state at the time when the seat belt apparatus 6 is operated, the seat occupancy determining apparatus may determine that the vehicle seat 1 is in the child seat fastened state when the above-described condition(s) is(are) satisfied.

According to the embodiment, the controller 3 sets the load difference value (WL−WR, WR−WL) obtained at a time when the seat belt apparatus 6 of the vehicle is operated as the minimum load value $W_{btm}$ or the plus reference value.

According to the embodiment, the value of the left-right load difference WL−WR obtained at the time when the seat belt apparatus 6 is operated is set as the minus reference value or the plus reference value, so that the seat occupancy determining apparatus accurately determines whether or not the vehicle seat 1 is in the child seat fastened state on the basis of the changes in the left-right load difference WL−WR occurring after the seat belt apparatus 6 is operated, without being influenced by the timing when the seat belt apparatus 6 is operated.

According to the embodiment, the seat occupancy determining apparatus determines that the vehicle seat 1 is in the child seat fastened state where the child seat 5 is fastened to the vehicle seat 1 by means of the seat belt apparatus 6 in the case where the total load WR+WL decreases by the predetermined value from the maximum load value $W_{max}$ (the total load reference value) and where the left-right load difference WL−WR increases by the predetermined load amount $W_{in}$ from the minimum load value $W_{btm}$ (i.e. the minus reference value, which is set as a negative value) after the sea belt apparatus 5 is operated, or in the case where the left-right load difference WL−WR decreases from the plus reference value, which is set as a positive value, by the predetermined value. Accordingly, the seat occupancy determining apparatus may accurately determine that the vehicle seat 1 is in the child seat fastened state in the case where the total load WR+WL (i.e. the total of the seating loads) decreases from the peak and where the load applied to one of the right side portion and the left side portion of the seat cushion 11 is eased.

The child seat 5 is fastened to the vehicle seat 1 in the manner where the child seat 5 is placed on the vehicle seat 1 and the buckle 64 is pressed in the downward direction in order to engage the tongue 63 with the buckle 64, therefore, the total seating load WR+WL applied to the vehicle seat 1 rapidly increases. Furthermore, the seating load applied to one of the right side portion and the left side portion of the seat cushion 11 at which the buckle 64 is provided rapidly increases when comparing to the load applied to the other one of the right side portion and the left side portion of the seat cushion 11 at which the buckle 64 is not provided.

When the fastening of the child seat 5 to the vehicle seat 1 is completed, the pressing force applied to the buckle 64 is eased. Therefore, the total load WR+WL applied to the vehicle seat 1 rapidly decreases and the imbalance between the seating loads applied to the right side portion and the left side portion of the seat cushion 11 is eliminated. According to the embodiment, the seat occupancy determining apparatus detects the rapid decrease of the total load WR+WL and the elimination of the imbalance of the seating loads between the right side portion and the left side portion of the vehicle seat 1 when the fastening of the child seat 5 on the vehicle seat 1 is completed, on the basis of the decrease of the total load WR+WL and the fluctuation of the left-right load difference WL−WR, so that the seat occupancy determining apparatus accurately determines that the vehicle seat 1 is in the child seat fastened state.

Furthermore, the seat occupancy determining apparatus according to the embodiment determines whether or not the vehicle seat 1 is in the child seat fastened state on the basis of the changes in the total load WR+WL and the left-right load difference WL−WR occurring after the buckle switch 65 is turned on. Therefore, the seat occupancy determining apparatus may accurately determine that the vehicle seat 1 is in the child seat fastened state when the above-mentioned condition(s) is (are) satisfied even if the ignition switch 8 of the vehicle is in the off-state at the time when the buckle switch 65 is operated.

According to the embodiment, the controller 3 sets the total load WR+WL obtained at the time when the seat belt apparatus 6 is operated as the maximum load value $W_{max}$ and sets the load difference value (WL−WR, RW−WL) obtained at the time when the seat belt apparatus 6 is operated as the minimum load value $W_{btm}$ or the plus reference value.

According to the embodiment, the total load WR+WL obtained when seat belt apparatus 6 is operated is set as the total load reference value (the maximum load value $W_{max}$) and the left-right load difference WL−WR obtained when the seat belt apparatus 6 is operated is set as the minus reference value (the predetermined load amount $W_{in}$) or the plus reference value, so that the seat occupancy determining apparatus accurately determines whether or not the vehicle seat 1 is in the child seat fastened state on the basis of the changes in the total load WR+WL and the left-right load difference WL−WR occurring after the seat belt apparatus 6 is operated with reference to the maximum load value $W_{max}$ and the predetermined load amount $W_{in}$ (or the plus reference value), respectively.

According to the embodiment, the right and left seat occupancy detecting sensors 2R and 2L are provided at the rear portion of the seat cushion 11.

According to the embodiment, the right seat occupancy detecting sensor 2R and the left seat occupancy detecting sensor 2L are provided at the rear portion of the seat cushion 11, so that the loads generated by the passenger or the child seat 5 are more likely to be applied to the right seat occupancy detecting sensor 2R and the left seat occupancy detecting sensor 2L. Therefore, even if the seat occupancy detecting sensor is not provided at the front portion of the seat cushion 11, the seat occupancy determining apparatus accurately detects the load applied to the vehicle seat 1, so that the seat occupancy determining apparatus accurately determines whether or not the vehicle seat 1 is in the child seat fastened state. Furthermore, because the number of the seat occupancy detecting sensors may be reduced when comparing to a know seat occupancy determining apparatus, the manufacturing costs of the seat occupancy determining apparatus according to the embodiment may be reduced.

According to the embodiment, at least one of the right and left seat occupancy detecting sensors 2R and 2L is provided in the vicinity of the supporting portion of the buckle 64 of the seat belt apparatus 6.

According to the embodiment, at least one of the right seat occupancy detecting sensor 2R and the left seat occupancy detecting sensor 2L is provided in the vicinity of the supporting portion of the buckle 64 of the seat belt apparatus 6, so that the increase of the load applied to the buckle 64 when the tongue 63 is engaged with the buckle 64 is surely detected.

According to the embodiment, the vehicle operation detecting portion includes the buckle switch 65 for detecting the engagement of the buckle 64 with the tongue 63 of the seat belt apparatus 6.

According to the embodiment, the buckle switch 64 for detecting the engagement of the tongue 63 and the buckle 64 of the seat belt apparatus 6 serves as the vehicle operation detecting portion. The seat occupancy determining apparatus may start detecting the seating load by means of the buckle switch 64 at the timing when the tongue 63 is engaged with the buckle 64 and accurately determines whether or not the vehicle seat 1 is in the child seat fastened state on the basis of the detected seating loads.

According to the embodiment, the seat occupancy determining apparatus simultaneously executes the seating load increase and decrease determination and the seating load peak determination. The seating load increase and decrease determination is satisfied in the case where the total load WR+WL decreases from the maximum load value $W_{max}$ by the predetermined value and where the left-right load difference WL−WR increases from the minimum load value $W_{btm}$, which is set as the negative value, by the predetermined load amount $W_{in}$, or in the case where the left-right load difference WL−WR decreases from the plus reference value, which is set as the positive value, by the predetermined value. The seating load peak determination is satisfied in the case where the total load WR+WL increases at a predetermined changing speed or faster at the time approximate to when (e.g. before and after) the seat belt apparatus 6 is operated and then, the total load WR+WL decreases at a predetermined changing speed or lower. The seat occupancy determining apparatus determines that the child seat 5 is placed on the vehicle seat 1 and the vehicle seat 1 is in the child seat fastened state where the child seat 5 is fastened to the vehicle seat 1 by means of the seat belt apparatus 6 in the case where at least one of the seating load increase and decrease determination and the seating load peak determination is satisfied. Accordingly, the seat occupancy determining apparatus may accurately determine whether or not the vehicle seat 1 is in the child seat fastened state.

The principles, preferred embodiment and mode of operation of this disclosure have been described in the foregoing specification. However, the disclosure which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the disclosure. Accordingly, it is expressly intended that all such variations, changes and equivalents which fall within the spirit and scope of the disclosure as defined in the claims, be embraced thereby.

The invention claimed is:

1. A seat occupancy determining apparatus comprising:
only one left load detecting portion provided at a left side portion of a seat portion of a vehicle seat and detecting a load applied to the left portion of the seat portion;
only one right load detecting portion provided at a right side portion of the seat portion and detecting a load applied to the right side portion of the seat portion;
a vehicle operation detecting portion for detecting an operation of a predetermined component of a vehicle; and
a seat occupancy determining portion determining a seat occupancy state of the vehicle seat on the basis of signals outputted from the vehicle operation detecting portion, the only one left load detecting portion and the only one right load detecting portion,
the seat occupancy determining portion calculating a load difference value by subtracting the load detected by one of the right and left load detecting portion from the load detected by the other one of the right and left load detecting portion and determining that a child seat is placed on the vehicle seat and the vehicle seat is in a child seat fastened state where the child seat is fastened to the vehicle seat by means of a seat belt apparatus in a case where an increase of the load difference value from a minus reference value, which is set as a negative value, by a predetermined value occurs or in a case where a decrease of the load difference value from a plus reference value, which is set as a positive value, by a predetermined value occurs after the predetermined component of the vehicle is operated.

2. The seat occupancy determining apparatus according to claim 1, wherein the seat occupancy determining portion sets the load difference value obtained at a time when the predetermined component of the vehicle is operated as the minus reference value or the plus reference value.

3. The seat occupancy determining apparatus according to claim 2, wherein the right and left load detecting portion are provided at a rear portion of the seat portion.

4. The seat occupancy determining apparatus according to claim 3, wherein at least one of the right and left load detecting portion is provided in the vicinity of a supporting portion of a buckle of the seat belt apparatus.

5. The seat occupancy determining apparatus according to claim 2, wherein the vehicle operation detecting portion includes a buckle switch for detecting an engagement of a buckle with a tongue of the seat belt apparatus.

6. The seat occupancy determining apparatus according to claim 1, wherein the right and left load detecting portion are provided at a rear portion of the seat portion.

7. The seat occupancy determining apparatus according to claim 6, wherein at least one of the right and left load detecting portion is provided in the vicinity of a supporting portion of a buckle of the seat belt apparatus.

8. The seat occupancy determining apparatus according to claim 7, wherein the vehicle operation detecting portion includes a buckle switch for detecting an engagement of the buckle with a tongue of the seat belt apparatus.

9. The seat occupancy determining apparatus according to claim 6, wherein the vehicle operation detecting portion includes a buckle switch for detecting an engagement of a buckle with a tongue of the seat belt apparatus.

10. The seat occupancy determining apparatus according to claim 1, wherein the vehicle operation detecting portion includes a buckle switch for detecting an engagement of a buckle with a tongue of the seat belt apparatus.

11. The seat occupancy determining apparatus according to claim 1, wherein the only one left load detecting portion and the only one right load detecting portion each includes only one load sensor having a strain gauge.

12. A seat occupancy determining apparatus comprising:
a single left load detecting portion provided at a left side portion of a seat portion of a vehicle seat and detecting a load applied to the left portion of the seat portion;
a single right load detecting portion provided at a right side portion of the seat portion and detecting a load applied to the right side portion of the seat portion;
a vehicle operation detecting portion for detecting an operation of a predetermined component of a vehicle; and a seat occupancy determining portion determining a seat occupancy state of the vehicle seat on the basis of signals outputted from the vehicle operation detecting portion, the single left load detecting portion and the single right load detecting portion, the seat occupancy determining portion calculating a total load value by adding the load detected by the right load detecting portion and the load detected by the left load detecting portion and a load difference value by subtracting the load detected by one of the right and left load detecting portion from the load detected by the other one of the right and left load detecting portion, and determining that a child seat is placed on the vehicle seat and the vehicle seat is in a child seat fastened state where the child seat is fastened to the vehicle seat by means of a seat belt apparatus in a case where a decrease of the total load value from a total load reference value by a predetermined value and an increase of the load difference value from a minus reference value, which is set as a negative value, by a predetermined value occurs, or a decrease of the load difference value from a plus reference value, which is set as a positive value, by a predetermined value, occurs after the predetermined component of the vehicle is operated.

13. The seat occupancy determining apparatus according to claim 12, wherein the seat occupancy determining portion sets the total load value obtained at the time when the predetermined component of the vehicle is operated as the total load reference value and sets the load difference value obtained at the time when the predetermined component of the vehicle is operated as the minus reference value or the plus reference value.

14. The seat occupancy determining apparatus according to claim 13, wherein the right and left load detecting portion are provided at a rear portion of the seat portion.

15. The seat occupancy determining apparatus according to claim 14, wherein at least one of the right and left load detecting portion is provided in the vicinity of a supporting portion of a buckle of the seat belt apparatus.

16. The seat occupancy determining apparatus according to claim 13, wherein the vehicle operation detecting portion includes a buckle switch for detecting an engagement of a buckle with a tongue of the seat belt apparatus.

17. The seat occupancy determining apparatus according to claim 12, wherein the right and left load detecting portion are provided at a rear portion of the seat portion.

18. The seat occupancy determining apparatus according to claim 17, wherein at least one of the right and left load detecting portion is provided in the vicinity of a supporting portion of a buckle of the seat belt apparatus.

19. The seat occupancy determining apparatus according to claim 12, wherein the vehicle operation detecting portion includes a buckle switch for detecting an engagement of a buckle with a tongue of the seat belt apparatus.

20. A seat occupancy determining apparatus comprising:

no more than one left load detecting portion provided at a left side portion of a seat portion of a vehicle seat and detecting a load applied to the left portion of the seat portion;

no more than one right load detecting portion provided at a right side portion of the seat portion and detecting a load applied to the right side portion of the seat portion;

a vehicle operation detecting portion for detecting an operation of a predetermined component of a vehicle; and a seat occupancy determining portion determining a seat occupancy state of the vehicle seat on the basis of signals outputted from the vehicle operation detecting portion, the no more than one left load detecting portion and the no more than one right load detecting portion, the seat occupancy determining portion calculating a total load value by adding the load detected by the right load detecting portion and the load detected by the left load detecting portion and a load difference value by subtracting the load detected by one of the right and left load detecting portion from the load detected by the other one of the right and left load detecting portion, the seat occupancy determining portion simultaneously executing a seating load increase and decrease determination and a seating load peak determination, wherein the seating load increase and decrease determination is satisfied in a case where a decrease of the total load value from a total load reference value by a predetermined value and an increase of the load difference value from a minus reference value, which is set as a negative value, by a predetermined value, occurs or in a case where a decrease of the load difference value from a plus reference value, which is set as a positive value, by a predetermined value, occurs after the predetermined component of the vehicle is operated and the seating load peak determination is satisfied in a case where an increase of the total load value at a predetermined changing speed or faster and then, a decrease of the total load value at a predetermined changing speed or lower, occurs approximately when the predetermined component of the vehicle is operated, and the seat occupancy determining portion determines that a child seat is placed on the vehicle seat and the vehicle seat is in a child seat fastened state where the child seat is fastened to the vehicle seat by means of a seat belt apparatus, in a case where at least one of the seating load increase and decrease determination and the seating load peak determination is satisfied.

* * * * *